United States Patent
Sofman et al.

(10) Patent No.: US 12,072,203 B2
(45) Date of Patent: Aug. 27, 2024

(54) SPEED AND ROUTE PLANNING IN VIEW OF WEATHER

(71) Applicant: Waymo LLC, Mountain View, CA (US)

(72) Inventors: Boris Sofman, Mountain View, CA (US); Benjamin Pitzer, Mountain View, CA (US); Michael James, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 2 days.

(21) Appl. No.: 17/207,663

(22) Filed: Mar. 20, 2021

(65) Prior Publication Data

US 2021/0293573 A1 Sep. 23, 2021

Related U.S. Application Data

(60) Provisional application No. 62/992,544, filed on Mar. 20, 2020.

(51) Int. Cl.
*G01C 21/36* (2006.01)
*G01C 21/34* (2006.01)
(Continued)

(52) U.S. Cl.
CPC ..... *G01C 21/3697* (2013.01); *G01C 21/3461* (2013.01); *G01C 21/3469* (2013.01);
(Continued)

(58) Field of Classification Search
CPC ............ G01C 21/3697; G01C 21/3461; G01C 21/3469; G01C 21/3492; G01C 21/3691; G01C 21/3453
See application file for complete search history.

(56) References Cited

U.S. PATENT DOCUMENTS 3,247,498 A * 4/1966 Sadvary ................. B64D 45/00
340/2.2
6,317,686 B1 11/2001 Ran
(Continued)

FOREIGN PATENT DOCUMENTS

JP    2015111056      6/2015
JP    2017021682 A    1/2017
(Continued)

OTHER PUBLICATIONS

International Searching Authority, International Search Report and Written Opinion mailed on Jul. 5, 2021, in connection with International Patent Application No. PCT/US2021/023364 filed on Mar. 20, 2021, 10 pages.

(Continued)

*Primary Examiner* — Vivek D Koppikar
*Assistant Examiner* — Godfrey Aleksander Maciorowski
(74) *Attorney, Agent, or Firm* — McDonnell Boehnen Hulbert & Berghoff LLP

(57) ABSTRACT

An example method involves identifying one or more potential route segments that collectively connect at least two geographical points, receiving spatiotemporal weather information that predicts future weather conditions along each of the potential segments, and, for each potential segment, evaluating a partial cost function that comprises a summation of a set of segment-weighted cost factors, where at least one segment-weighted cost factor comprises an adverse weather risk factor based on the future weather conditions along the potential segment. The method also involves selecting, based on a minimization of a total cost function, a set of selected segments and corresponding segment target speeds for the vehicle to utilize while traversing between the at least two geographical points so as to avoid adverse weather conditions, the total cost function being the sum of (Continued)

partial cost functions associated with a set of segments that collectively connect the at least two geographical points.

20 Claims, 10 Drawing Sheets

(51) Int. Cl.
G05D 1/00 (2006.01)
G08G 1/00 (2006.01)
(52) U.S. Cl.
CPC ....... G01C 21/3492 (2013.01); G05D 1/0287 (2013.01); G08G 1/22 (2013.01)

(56) References Cited

U.S. PATENT DOCUMENTS

| | | | |
|---|---|---|---|
| 7,925,426 B2 | 4/2011 | Koebler et al. | |
| 8,949,028 B1* | 2/2015 | Klampfl | G01C 21/3423 701/538 |
| 9,157,756 B2 | 10/2015 | Mason et al. | |
| 9,233,697 B2 | 1/2016 | Schoonmaker et al. | |
| 9,373,149 B2 | 6/2016 | Abhyanker | |
| 9,616,897 B2 | 4/2017 | Powers et al. | |
| 10,062,292 B2 | 8/2018 | Blomberg et al. | |
| 10,157,422 B2 | 12/2018 | Jordan Peters et al. | |
| 10,239,529 B2 | 3/2019 | Filev et al. | |
| 10,324,463 B1 | 6/2019 | Konrardy et al. | |
| 2004/0073361 A1* | 4/2004 | Tzamaloukas | H04W 8/04 701/414 |
| 2005/0187714 A1* | 8/2005 | Brulle-Drews | G01W 1/10 702/3 |
| 2007/0152804 A1 | 7/2007 | Breed et al. | |
| 2010/0161222 A1* | 6/2010 | Zhang | G08G 1/096716 701/414 |
| 2013/0204527 A1* | 8/2013 | Schilling | G01C 21/34 701/533 |
| 2013/0304379 A1* | 11/2013 | Fulger | G08G 1/096775 701/533 |
| 2014/0018985 A1* | 1/2014 | Gupta | G01C 21/3469 180/65.265 |
| 2014/0032114 A1* | 1/2014 | Titus | G01C 21/3694 340/539.22 |
| 2014/0081507 A1 | 3/2014 | Urmson et al. | |
| 2014/0309885 A1 | 10/2014 | Ricci | |
| 2016/0042321 A1* | 2/2016 | Held | G06Q 10/08355 705/338 |
| 2016/0054135 A1* | 2/2016 | Fowe | G01C 21/34 701/411 |
| 2017/0043789 A1* | 2/2017 | Hecht | B60W 50/085 |
| 2018/0080785 A1 | 3/2018 | Han et al. | |
| 2018/0136005 A1* | 5/2018 | Forutanpour | G01C 21/3476 |
| 2018/0170349 A1* | 6/2018 | Jobson | B60L 7/18 |
| 2018/0173242 A1* | 6/2018 | Lalonde | G05D 1/0214 |
| 2018/0174451 A1 | 6/2018 | Rao | |
| 2018/0283895 A1* | 10/2018 | Aikin | G01C 21/3415 |
| 2018/0341895 A1* | 11/2018 | Kislovskiy | G06Q 10/06313 |
| 2019/0120640 A1* | 4/2019 | Ho | G01C 21/3453 |
| 2019/0227550 A1 | 7/2019 | Yershov et al. | |
| 2019/0294167 A1 | 9/2019 | Kutila et al. | |
| 2019/0375394 A1 | 12/2019 | Maleki et al. | |
| 2021/0348926 A1* | 11/2021 | Dokken | G01C 21/203 |

FOREIGN PATENT DOCUMENTS

| | | | | |
|---|---|---|---|---|
| JP | 2018096889 | | 6/2018 | |
| KR | 20090074881 | | 7/2009 | |
| WO | WO-2008100010 A1 | * | 8/2008 | ......... G01C 21/3415 |
| WO | WO2016035561 | * | 9/2016 | |
| WO | WO2016135561 | * | 9/2016 | |
| WO | WO-2016135561 A1 | * | 9/2016 | |
| WO | 2017185020 A1 | | 10/2017 | |

OTHER PUBLICATIONS

Hatt, "Bosch wants to give self-driving cars hyperlocal road-weather reports", Jul. 25, 2018.

Rastgoftar et al., "A Data-Driven Approach for Autonomous Motion Planning and Control in Off-Road Driving Scenarios", May 25, 2018.

Katrakazas et al., "Real-time motion planning methods for autonomous on-road driving: State-of-the-art and future research directions", Nov. 3, 2015.

Oosthuizen et al., "Solar Electric Vehicle Energy Optimization for the Sasol Solar Challenge 2018," IEEE Access, vol. 7, Dec. 31, 2019, pp. 175143-175158.

* cited by examiner

700

702 IDENTIFYING ONE OR MORE POTENTIAL ROUTE SEGMENTS THAT COLLECTIVELY CONNECT AT LEAST TWO GEOGRAPHICAL POINTS

704 RECEIVING SPATIOTEMPORAL WEATHER INFORMATION THAT IS PREDICTIVE OF FUTURE WEATHER CONDITIONS ALONG EACH OF THE POTENTIAL ROUTE SEGMENTS

706 FOR EACH POTENTIAL ROUTE SEGMENT, EVALUATING A PARTIAL COST FUNCTION THAT COMPRISES A SUMMATION OF A SET OF SEGMENT-WEIGHTED COST FACTORS, WHERE AT LEAST ONE SEGMENT-WEIGHTED COST FACTOR COMPRISES AN ADVERSE WEATHER RISK FACTOR BASED ON THE FUTURE WEATHER CONDITIONS ALONG THE POTENTIAL ROUTE SEGMENT

708 SELECTING, BASED ON A MINIMIZATION OF A TOTAL COST FUNCTION, A SET OF SELECTED ROUTE SEGMENTS AND CORRESPONDING ROUTE SEGMENT TARGET SPEEDS FOR THE VEHICLE TO UTILIZE WHILE TRAVERSING BETWEEN THE AT LEAST TWO GEOGRAPHICAL POINTS SO AS TO AVOID ADVERSE WEATHER CONDITIONS, WHERE THE TOTAL COST FUNCTION IS THE SUM OF PARTIAL COST FUNCTIONS ASSOCIATED WITH A SET OF ROUTE SEGMENTS THAT COLLECTIVELY CONNECT THE AT LEAST TWO GEOGRAPHICAL POINTS

Figure 7

SPEED AND ROUTE PLANNING IN VIEW OF WEATHER

CROSS-REFERENCE TO RELATED APPLICATION

This application claims priority to U.S. provisional patent application No. 62/992,544, filed Mar. 20, 2020, which is hereby incorporated by reference in its entirety.

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

When operating an autonomous vehicle, bad weather can decrease the performance or reliability of autonomous operations. For example, bad weather can result in safety concerns while transporting freight, decreased reliability of sensors, damage to the vehicle, loss of goods, or long time delays. Weather is less of a concern during short autonomous vehicle trips because weather can be more easily predicted and planned around. However, during long runs (e.g., 1000 miles), uncertainty arises in regards to weather farther out, since weather is always changing and can be difficult to plan around before the long drive. There are more opportunities to encounter bad or otherwise undesirable weather and there are more uncertainties as to whether the vehicle will encounter disruptive weather during long drives. This mitigation solution allows for autonomous vehicles to operate with less-strict constraints and not be bottlenecked by concerns of weather for long-route freight transport.

SUMMARY

The present disclosure generally relates to speed planning for an autonomous vehicle based on weather conditions.

Accordingly, a first embodiment describes a method performed by a computing system configured to control operation of a vehicle. The method involves identifying one or more potential route segments that collectively connect at least two geographical points. The method also involves receiving spatiotemporal weather information that is predictive of future weather conditions along each of the potential route segments. The method also involves for each potential route segment, evaluating a partial cost function that comprises a summation of a set of segment-weighted cost factors, where at least one segment-weighted cost factor comprises an adverse weather risk factor based on the future weather conditions along the potential route segment. The method also involves selecting, based on a minimization of a total cost function, a set of selected route segments and corresponding route segment target speeds for the vehicle to utilize while traversing between the at least two geographical points so as to avoid adverse weather conditions, where the total cost function is the sum of partial cost functions associated with a set of route segments that collectively connect the at least two geographical points.

A second embodiment describes an article of manufacture including a non-transitory computer-readable medium having stored thereon instructions that, when executed by a processor in a computing system, causes the computing system to perform operations. The operations include identifying one or more potential route segments that collectively connect at least two geographical points. The operations also include receiving spatiotemporal weather information that is predictive of future weather conditions along each of the potential route segments. The operations also include for each potential route segment, evaluating a partial cost function that comprises a summation of a set of segment-weighted cost factors, where at least one segment-weighted cost factor comprises an adverse weather risk factor based on the future weather conditions along the potential route segment. The operations also include selecting, based on a minimization of a total cost function, a set of selected route segments and corresponding route segment target speeds for a vehicle to utilize while traversing between the at least two geographical points so as to avoid adverse weather conditions, where the total cost function is the sum of partial cost functions associated with a set of route segments that collectively connect the at least two geographical points.

A third embodiment describes a system comprising at least one processor and a memory storing instructions that, when executed by the at least one processor, cause the at least one processor to perform operations. The operations include identifying one or more potential route segments that collectively connect at least two geographical points. The operations also include receiving spatiotemporal weather information that is predictive of future weather conditions along each of the potential route segments. The operations also include for each potential route segment, evaluating a partial cost function that comprises a summation of a set of segment-weighted cost factors, where at least one segment-weighted cost factor comprises an adverse weather risk factor based on the future weather conditions along the potential route segment. The operations also include selecting, based on a minimization of a total cost function, a set of selected route segments and corresponding route segment target speeds for a vehicle to utilize while traversing between the at least two geographical points so as to avoid adverse weather conditions, where the total cost function is the sum of partial cost functions associated with a set of route segments that collectively connect the at least two geographical points.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 7 illustrates a flow chart of a method for speed and route planning based on weather, according to example embodiments.

DETAILED DESCRIPTION

Figure 1:
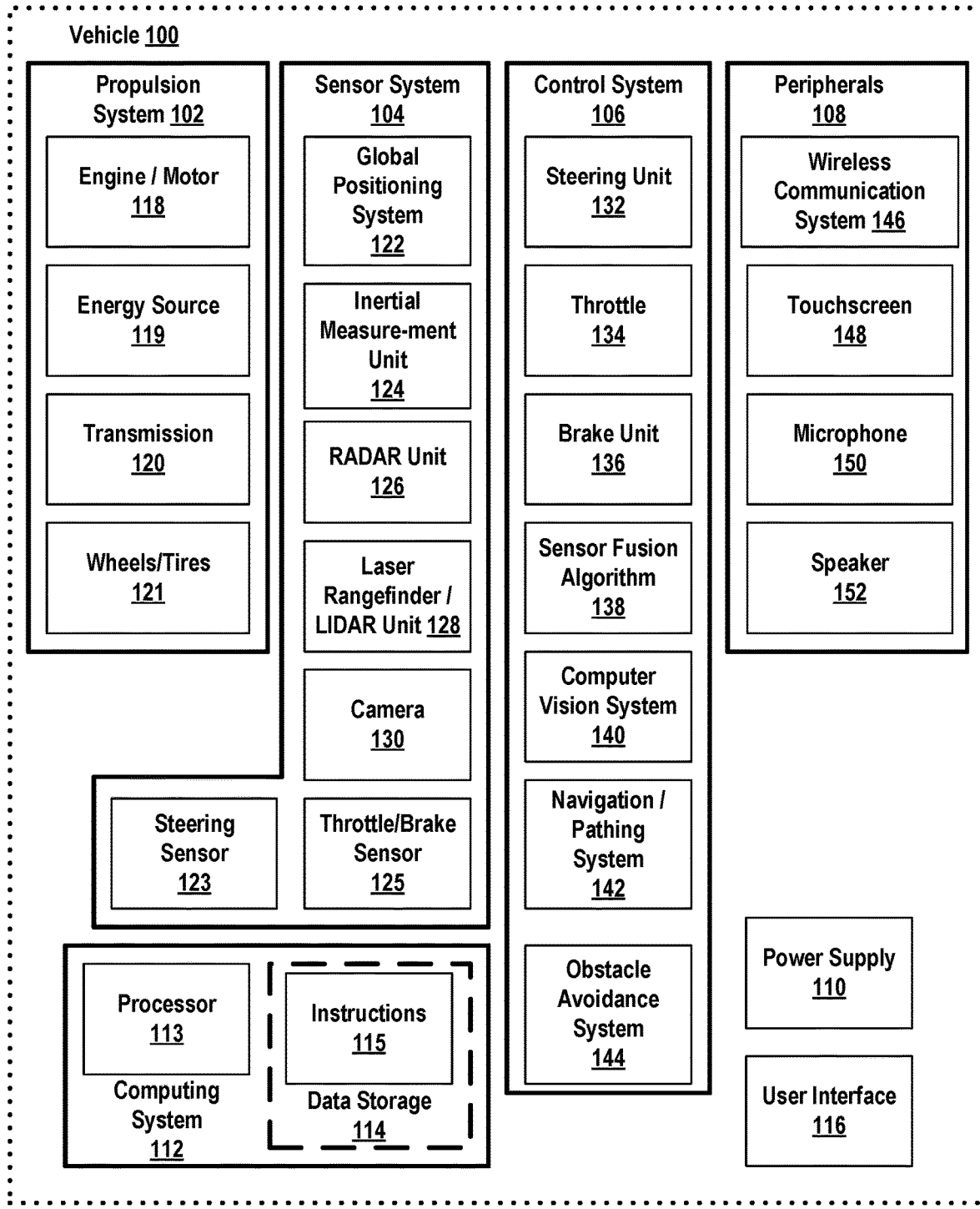
FIG. 1 is a functional block diagram illustrating a vehicle, according to one or more example embodiments.
Figure 2A:
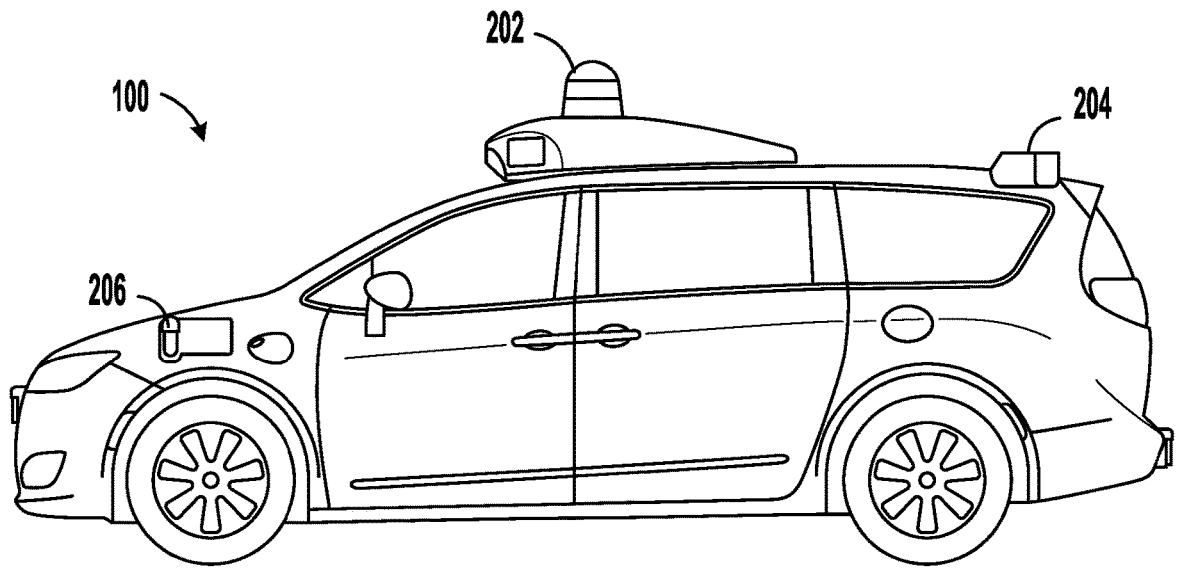
FIG. 2A illustrates a side view of a vehicle, according to one or more example embodiments.
Figure 2B:
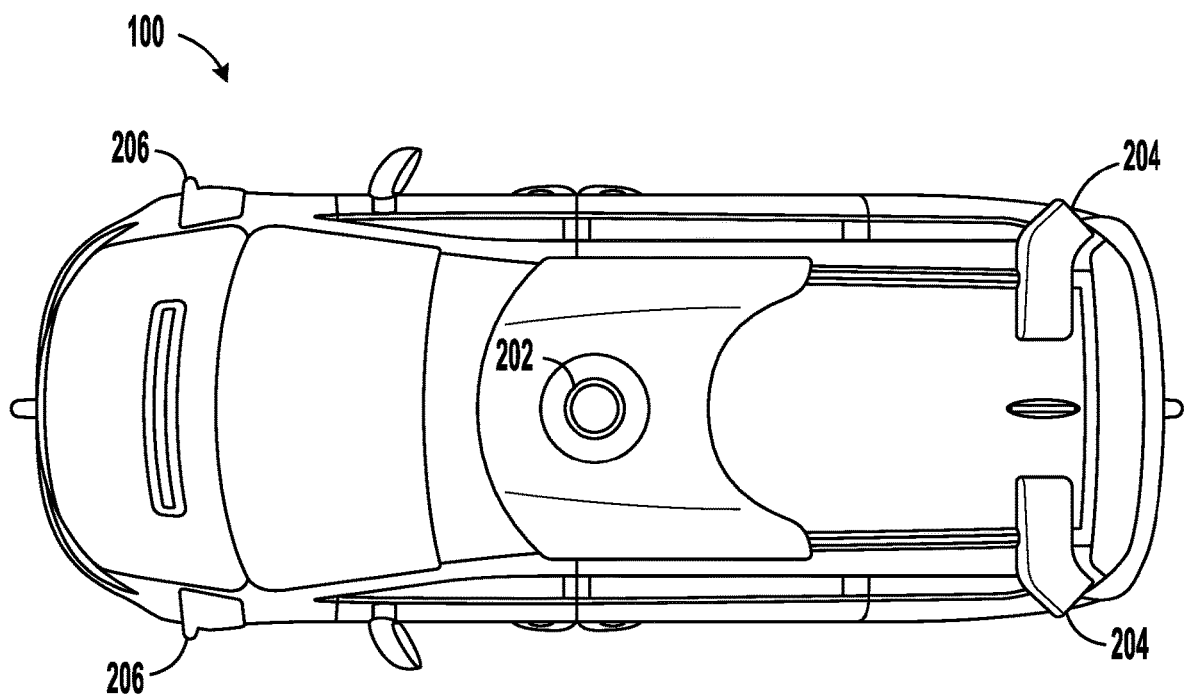
FIG. 2B illustrates a top view of a vehicle, according to one or more example embodiments.
Figure 2C:
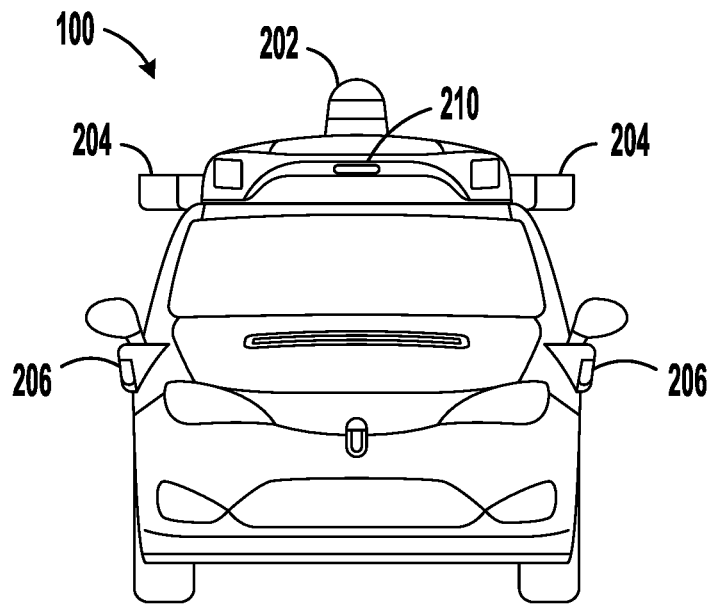
FIG. 2C illustrates a front view of a vehicle, according to one or more example embodiments.
Figure 2D:
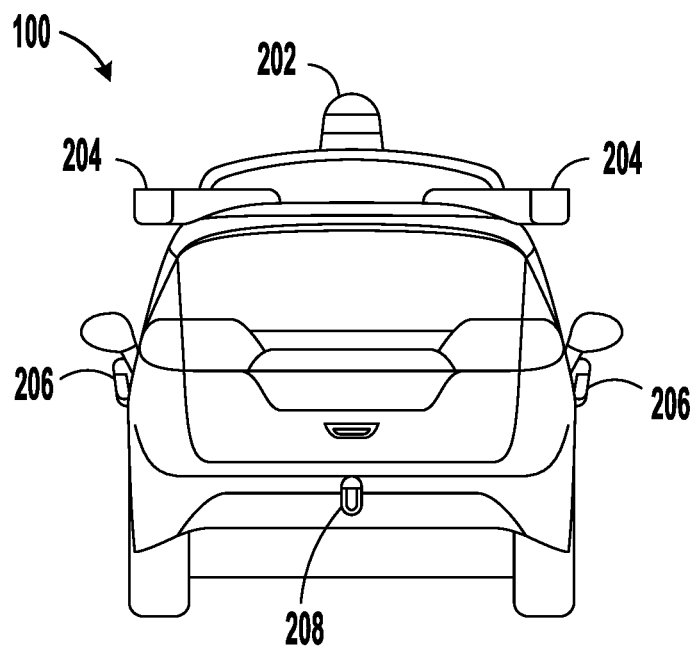
FIG. 2D illustrates a back view of a vehicle, according to one or more example embodiments.
Figure 2E:
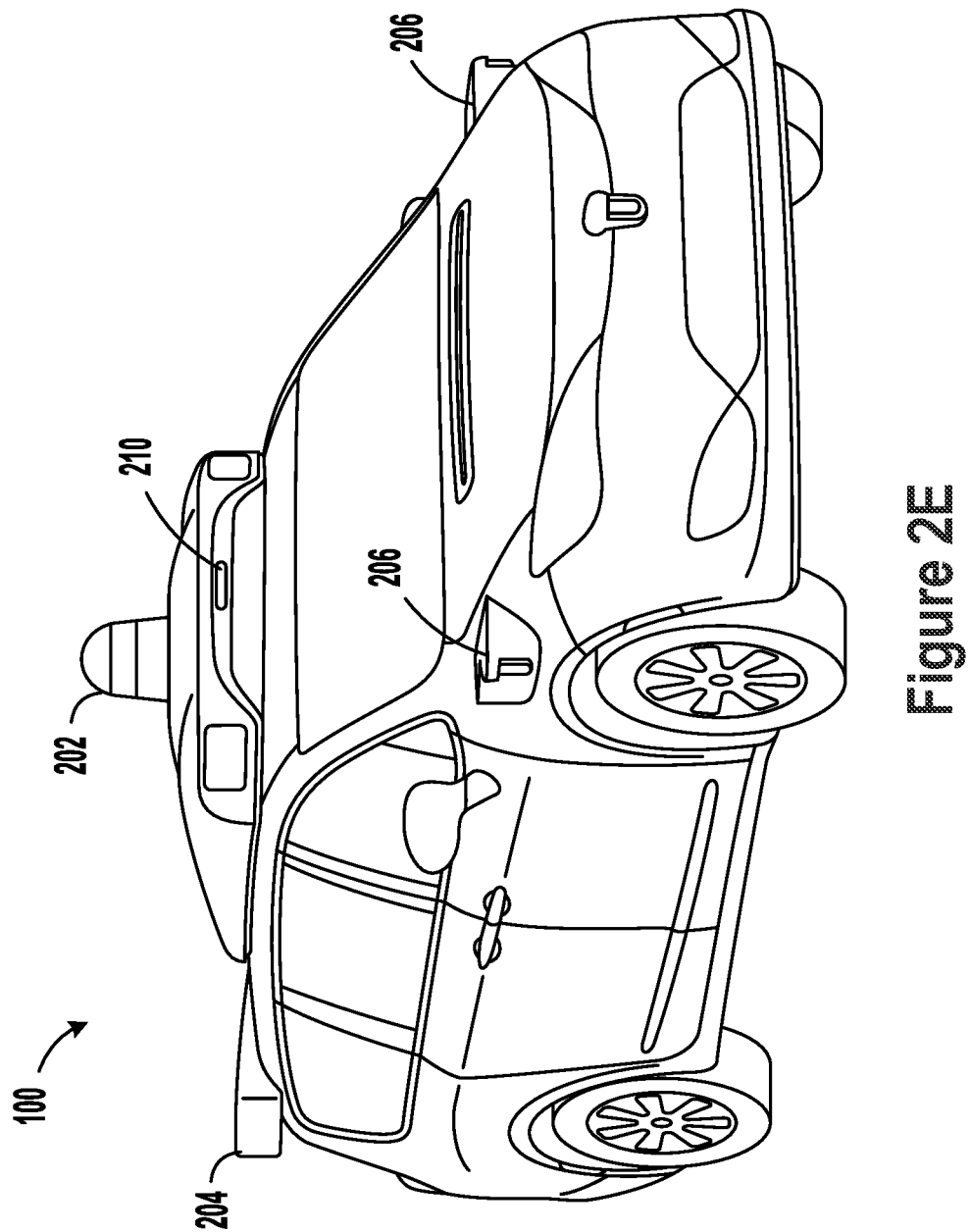
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure provides methods and systems for speed planning for an autonomous vehicle, such as a truck, that is or will be travelling along a route, particularly based on predicted weather conditions along the route, such as weather forecasts relating to one or more segments of the route. In doing so, speed can be modulated to advantageously minimize the risk of travel through an adverse weather condition (e.g., spending a minimal amount of time travelling through the undesirable weather condition or entirely avoiding travel through the undesirable weather condition) that is predicted to be present along at least a portion of the route, thus promoting more reliable and/or safe planned travel for the vehicle. An adverse weather condition can include, for example, heavy rain or snow, thick fog, ice, or sleet, among other possibilities. The type of weather considered by the vehicle's control system and/or associated computing devices and processors to be adverse can be predefined (e.g., hard-coded in the vehicle's software) and dynamically-updated as needed, or can be determined in some other manner.

To determine an optimal set of target speeds to use for the segments that make up a particular route (e.g., a first target speed for a first segment, a second target speed for a second segment, and so on), for instance, the vehicle can use a cost function. For instance, the vehicle can compute an optimal sequence of target speeds per segment throughout the route that minimizes a cost function that is applied across the entire route and that is a sum of the costs of each segment under this choice of speed targets. The cost of each segment can be based on various cost factors, such as a probability and/or severity of a weather condition anticipated to be present while the vehicle is traveling along a given segment, among other possible factors.

The present disclosure also provides methods and systems for adjusting the route of an autonomous vehicle, such as a truck, that is travelling along a route, particularly based on predicted weather conditions along the route, such as weather forecasts relating to one or more segments of the route. In doing so, the route can be adjusted to advantageously minimize the risk of travel through an adverse weather condition (e.g., heavy rain or snow, thick fog, etc.) that is predicted to be present along at least a portion of the route, thus promoting more reliable and/or safe planned travel for the vehicle.

As will be discussed in more detail herein, determinations as to what the route and/or set of speeds should be in the first place (or should be adjusted to during travel), can be based on minimizing travel through undesirable weather conditions, and perhaps additionally based on avoiding other environmental conditions/hindrances such as traffic, construction, or abnormal or dangerous conditions (e.g., accidents, potholes, nearby wildfire, police activity, etc.). The vehicle's control system can continually replan its route, or strategy on the current route, to take the latest conditions into account and optimize the route or strategy on the route in view of such conditions.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computing system 112, data storage 114, and user interface 116. The subsystems and components of vehicle 100 may be interconnected in various ways (e.g., wired or wireless connections). In other examples, vehicle 100 may include more or fewer subsystems. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use cellular communication, such as CDMA, EVDO, GSM/GPRS, 4G cellular communication, such as WiMAX or LTE, or 5G cellular communication. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computing system 112 to perform operations, such as operations described therein. As such, computing system 112 may include at least one processor 113 (which could include at least one microprocessor) operable to execute instructions 115 stored in a non-transitory computer readable medium, such as data storage 114. In some implementations, computing system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Instructions 115 can include at least instructions for performing the operations described herein with respect to FIG. 7. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computing system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computing system 112 may control the function of vehicle 100 based on inputs received from various subsystems (e.g., propulsion system 102, sensor system 104, and control system 106), as well as from user interface 116. For example, computing system 112 may utilize input from sensor system 104 in order to estimate the output produced by propulsion system 102 and control system 106. Depending upon the embodiment, computing system 112 could be operable to monitor many aspects of vehicle 100 and its subsystems. In some embodiments, computing system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computing system 112 could interact to provide an indication of an input provided to control a vehicle or an indication of the surroundings of a vehicle.

In some embodiments, computing system 112 may make a determination about various objects based on data that is provided by systems other than the radio system. For example, vehicle 100 may have lasers or other optical sensors configured to sense objects in a field of view of the vehicle. Computing system 112 may use the outputs from the various sensors to determine information about objects in a field of view of the vehicle, and may determine distance and direction information to the various objects. Computing system 112 may also determine whether objects are desirable or undesirable based on the outputs from the various sensors.

Although FIG. 1 shows various components of vehicle 100, i.e., wireless communication system 146, computing system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3:
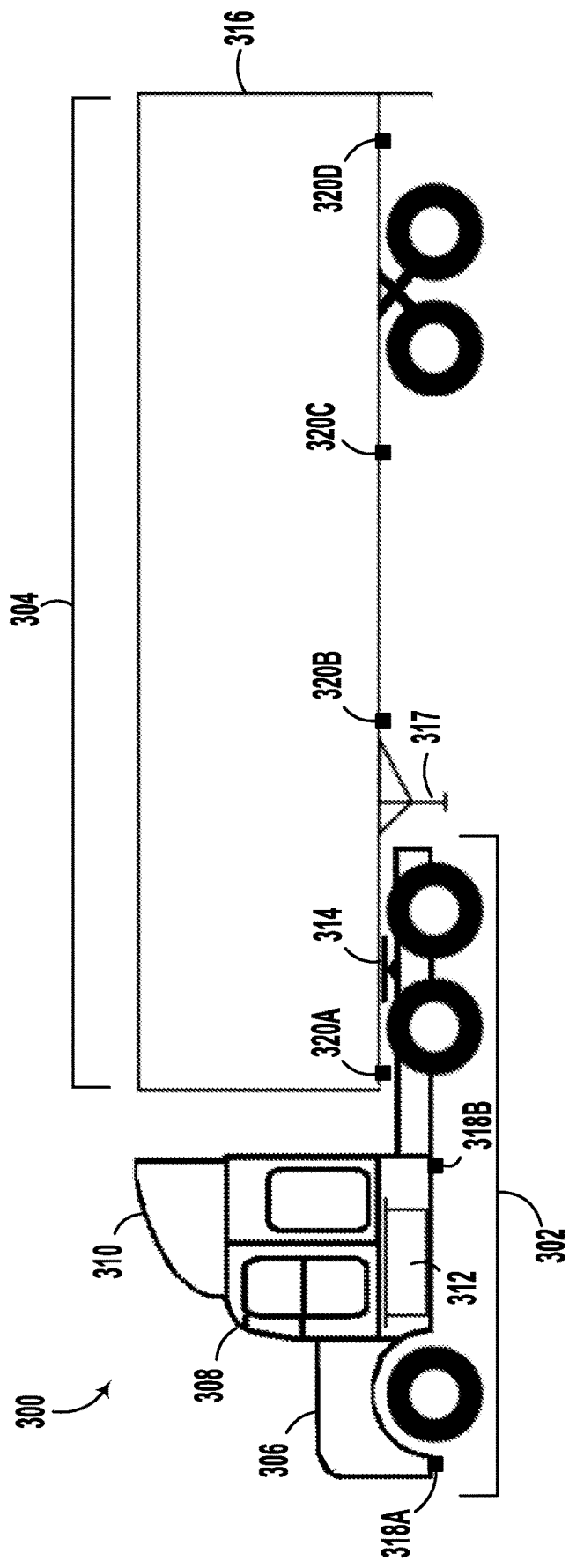
FIG. 3 illustrates a side view of an example vehicle in the form of a semi-trailer truck having a tractor unit and a semi-trailer.

FIG. 3 illustrates a side view of an example vehicle 300 in the form of a semi-trailer truck having a tractor unit 302 and a semi-trailer 304.

Vehicle 300 represents a larger vehicle that may use any of the operations described herein to facilitate travel on planned routes, such as for the purpose of delivering items to a particular location. The configuration of vehicle 300 serves as one example implementation. Other examples can involve other types of vehicles (e.g., multi-trailer trucks, military vehicles, off road vehicles).

As shown in FIG. 3, tractor unit 302 includes engine compartment 306, cabin 308, air dam 310, fuel tank 312, and fifth wheeling coupling 314. Tractor unit 302 may be configured navigate and transport items within semi-trailer 304. As such, tractor unit 302 represents one example configuration of a vehicle configured to transport objects within semi-trailer 304. Other examples of tractor unit 302 are possible.

Engine compartment 306 represents an area where an engine may be housed. As such, the engine may correspond to a complex mechanical device configured to convert energy into useful motion for tractor unit 302. In some examples, tractor unit 302 may include one or multiple engines. In other instances, tractor unit 302 may an electric vehicle powered by one or multiple electric motors.

Cabin 308 is shown as an enclosed space where a driver and/or passengers may be seated. In other examples, the size and configuration of cabin 308 can differ. As such, cabin 308 may also include a sleeper where a driver or passenger may rest. Air dam 310 represents an aerodynamic device configuration to enhance operation of tractor unit 302.

Semi-trailer 304 is shown coupled to tractor unit 302 and includes enclosed cargo space 316 and landing gear 317 configured for use when semi-trailer 304 is detached from tractor unit 302. As such, semi-trailer 304 and tractor unit 302 may include components configured to couple them together. Cargo space 316 may hold and protect objects or materials during transportation by tractor unit 302.

In some embodiments, vehicle 300 can also include one or more radar units and/or other vehicle sensor systems. For example, radar units 318A, 318B are shown coupled to the underbody of tractor unit 302. The positions and orientations of radar units 318A, 318B represent one example layout of coupling radar units to 318A, 318B to tractor unit 302. In other examples, tractor unit 302 can include more or fewer radar units at other positions. For example, tractor unit 302 may only include radar unit 318B coupled to its underbody. Further, although radar units 318A, 318B are shown below a bumper line of tractor unit 302, radar units 318A, 318B can be positioned at different heights off the ground in other examples.

Additionally or alternatively, vehicle 300 can include radar units or other sensor units coupled to other locations of vehicle 300, such as the underside (e.g., underbody) of semi-trailer 304. For example, radar units 320A, 320B, 320C, and 320D are shown coupled to the underside of semi-trailer 304. The positions and orientations of radar units 320A, 320B, 320C, and 320D represent one example layout of coupling radar units to semi-trailer 304. In other examples, semi-trailer 304 can include more or fewer radar units at other positions. Further, although radar units 320A, 320B, 320C, and 320D are shown below a bumper line of semi-trailer 304, radar units 320A, 320B, 320C, and 320D can be positioned at different heights off the ground in other examples.

Figure 4:
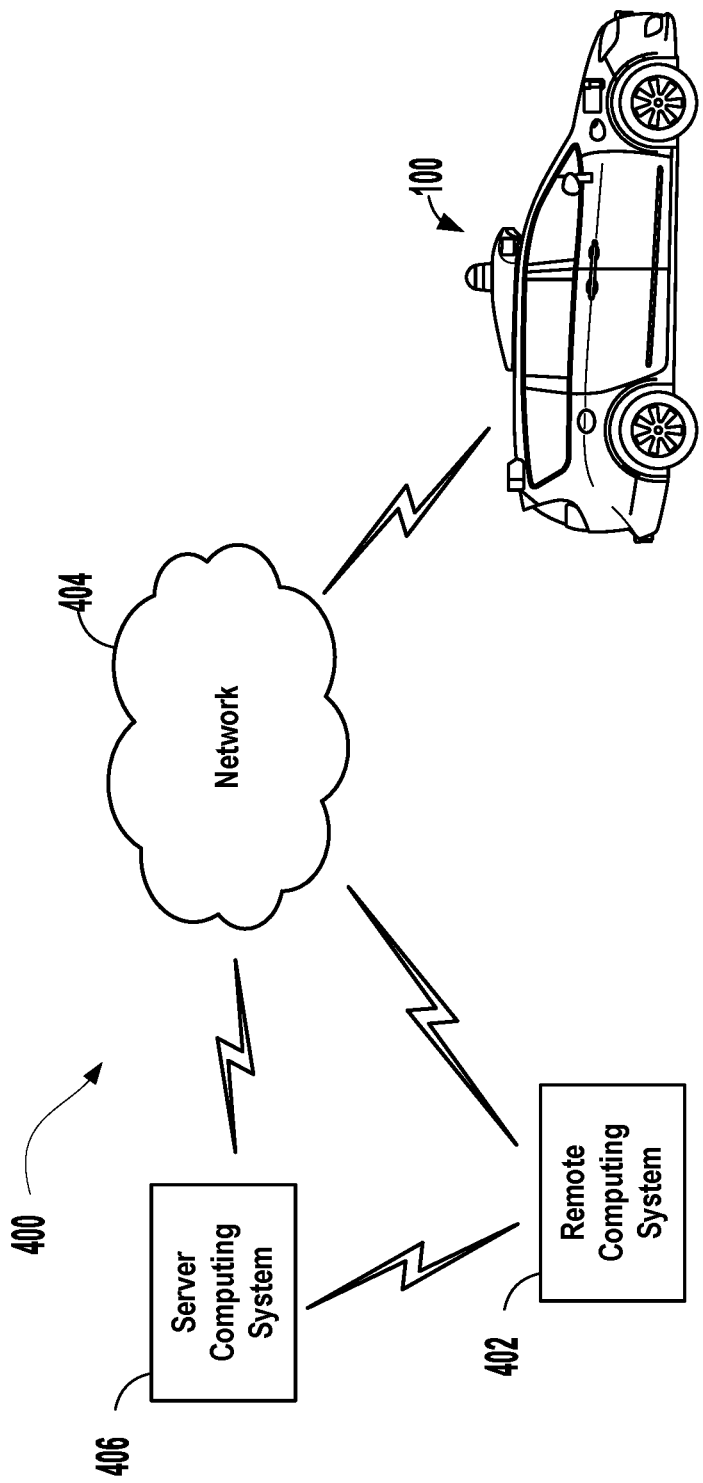
FIG. 4 is a conceptual illustration of wireless communication between various computing systems related to an autonomous vehicle.

FIG. 4 is a conceptual illustration of wireless communication between various computing systems related to an autonomous vehicle, according to an example implementation. In particular, wireless communication may occur between remote computing system 402 and vehicle 100 (e.g., computing system 112 of vehicle 100) via network 404. Wireless communication may also occur between server computing system 406 and remote computing system 402, and between server computing system 406 and vehicle 100. During the operation of the vehicle 100, the vehicle may send and receive data from both the server computing system 406 and remote computing system 402 to aid in the operation of the vehicle 100. The vehicle 100 may communicate data related to its operation and data from its sensors to the server computing system 406 and the remote computing system 402. Additionally, the vehicle 100 may receive operational instructions and/or data related to objects sensed by the vehicle's sensors from the server computing system 406 and remote computing system 402.

Vehicle 100 can correspond to various types of vehicles capable of transporting passengers or objects between locations, and may take the form of any one or more of the vehicles discussed above, including that of vehicle 300.

Remote computing system 402 may represent any type of device related to remote assistance and operation techniques, including but not limited to those described herein. Within examples, remote computing system 402 may represent any type of device configured to (i) receive information related to vehicle 100, (ii) provide an interface through which a human operator or computer operator can in turn perceive the information and input a response related to the information, and (iii) transmit the response to vehicle 100 or to other devices. Remote computing system 402 may take various forms, such as a workstation, a desktop computer, a laptop, a tablet, a mobile phone (e.g., a smart phone), and/or a server. In some examples, remote computing system 402 may include multiple computing devices operating together in a network configuration.

Remote computing system 402 may include one or more subsystems and components similar or identical to the subsystems and components of vehicle 100. At a minimum, remote computing system 402 may include a processor configured for performing various operations described herein. In some implementations, remote computing system 402 may also include a user interface that includes input/output devices, such as a touchscreen and a speaker. Other examples are possible as well.

Network 404 represents infrastructure that enables wireless communication between remote computing system 402 and vehicle 100. Network 404 also enables wireless communication between server computing system 406 and remote computing system 402, and between server computing system 406 and vehicle 100.

The position of remote computing system 402 can vary within examples. For instance, remote computing system 402 may have a remote position from vehicle 100 that has a wireless communication via network 404. In another example, remote computing system 402 may correspond to a computing device within vehicle 100 that is separate from vehicle 100, but with which a human operator can interact while a passenger or driver of vehicle 100. In some examples, remote computing system 402 may be a computing device with a touchscreen operable by the passenger of vehicle 100.

In some implementations, operations described herein that are performed by remote computing system 402 may be additionally or alternatively performed by vehicle 100 (i.e., by any system(s) or subsystem(s) of vehicle 100). In other words, vehicle 100 may be configured to provide a remote assistance mechanism with which a driver or passenger of the vehicle can interact.

Server computing system 406 may be configured to wirelessly communicate with remote computing system 402 and vehicle 100 via network 404 (or perhaps directly with remote computing system 402 and/or vehicle 100). Server computing system 406 may represent any computing device configured to receive, store, determine, and/or send information relating to vehicle 100 and the remote assistance thereof. As such, server computing system 406 may be configured to perform any operation(s), or portions of such operation(s), that is/are described herein as performed by remote computing system 402 and/or vehicle 100. Some implementations of wireless communication related to remote assistance may utilize server computing system 406, while others may not.

Server computing system 406 may include one or more subsystems and components similar or identical to the subsystems and components of remote computing system 402 and/or vehicle 100, such as a processor configured for performing various operations described herein, and a wireless communication interface for receiving information from, and providing information to, remote computing system 402 and vehicle 100.

Example operations relating to speed and route planning in view of weather will now be described in more detail.

The operations described below, including those of the method 700 of FIG. 7, will be described primarily as being performed by vehicle 100—that is, by computing system 112 of vehicle 100. However, it should be understood that, for the method 700, and other processes and methods disclosed herein, the operations described below can additionally or alternatively be performed in whole or in part by other systems of vehicle 100 described above, by multiple vehicles (i.e., such that operations are distributed across multiple vehicle computing systems), by a remote server/external computing system (e.g., systems 402 and 406), and/or by a combination of one or more external computing systems and one or more vehicles, among other possibilities.

The disclosed operations can generally involve determining a set of route segments and corresponding route segment target speeds for the vehicle 100 to utilize while traversing a route in order to avoid or minimize travel through adverse weather conditions that have been identified on the route. The disclosed operations utilize spatiotemporal weather information such as hyperlocal weather forecasts or other types of weather data in order to have accurate predictions of the times and/or locations at which weather conditions (including adverse weather that would be desirable to avoid) will be present along segments of various routes along which the vehicle 100 can travel. In some embodiments, the spatiotemporal weather information could be received by the computing system 112 by way of wireless communication system 146 or by another communication means. As described herein, the spatiotemporal weather information could be received periodically and/or dynamically. The computing system 112 can use the spatiotemporal weather information, as well as a variety of other techniques described in more detail below, to find optimal speeds/routes to traverse to avoid adverse weather. In some cases, it can be ideal to avoid adverse weather entirely, although in other cases the disclosed operations can be implemented with the goal of minimizing exposure of the vehicle 100 to such adverse weather, such as in a scenario in which it is not ideal to select a route or speed that avoids the adverse weather entirely (e.g., the vehicle 100 has a specific delivery time and no other route options are available or ideal).

In an example, a route that the vehicle 100 can traverse can take the form of a navigational set of directions that the vehicle 100 follows to travel from an initial location to a destination along various roads and/or other travelable areas. The route can be defined by or can pass through at least two geographical points, including but not limited to buildings, other landmarks, intersections, street signs, locations at which the speed limit changes (e.g., speed limit signs), on or off ramps, gas stations, charging stations, loading docks, maintenance facilities, a defined boundary of a town/city/state/county/etc., and/or an estimated edge of a bounded area in which a particular patch of weather is or is predicted to be present, among other possibilities.

In some examples, the computing system 112 can determine a route itself, using the disclosed operations discussed herein (e.g., method 700) and/or using one or more other techniques. In other examples, the computing system 112 can receive, from another computing system remote from the vehicle 100 (e.g., server computing system 406, data identifying a route. In still other examples, identifying the route can involve referring to an existing route stored in memory accessible to the computing system 112. In still other examples, identifying the route can involve determining the route, such as by determining a plurality of route options to get to a particular destination and then selecting one of the plurality of route options based on one or more criteria (e.g., time, distance, etc.).

In one embodiment, the computing system 112 can determine the route before the vehicle 100 embarks from the initial location, as noted above. As an example, between Dallas and Los Angeles there could be three different route variations, each with a respective fixed distance. The computing system 112 can use one or more of the disclosed operations to determine which route to select in the first place. As such, the route segments that make up the route the vehicle 100 traverses per the present disclosure can be route segments of a preplanned route or a selected one of a plurality of preplanned routes.

In another embodiment, the computing system 112 can determine the route using one or more techniques other than method 700 and can then perform one or more of the disclosed operations (e.g., once, or interactively, such as at repeated intervals or continuously) to adjust the route during the trip to optimize for preferable weather conditions (trading off some distance/time for increased safety or conditional predictability).

In another embodiment, the computing system 112 can identify new routes after embarking and then select (and then perhaps adjust) one of the new routes using one or more of the disclosed operations.

To facilitate the assessment of weather conditions along potential route segments that the vehicle 100 could traverse, as well as to assist in determining or making adjustments to the route itself, the computing system 112 can consider a route between at least two geographical points as one or more potential route segments that collectively connect the at least two geographical points. As will be discussed in more detail herein, the computing system 112 can at times plan (or replan) a route and then divide the route into one or more potential route segments for the purposes of performing the techniques described herein, or can alternatively use the herein-described techniques to determine the route in the first place.

Figure 5:
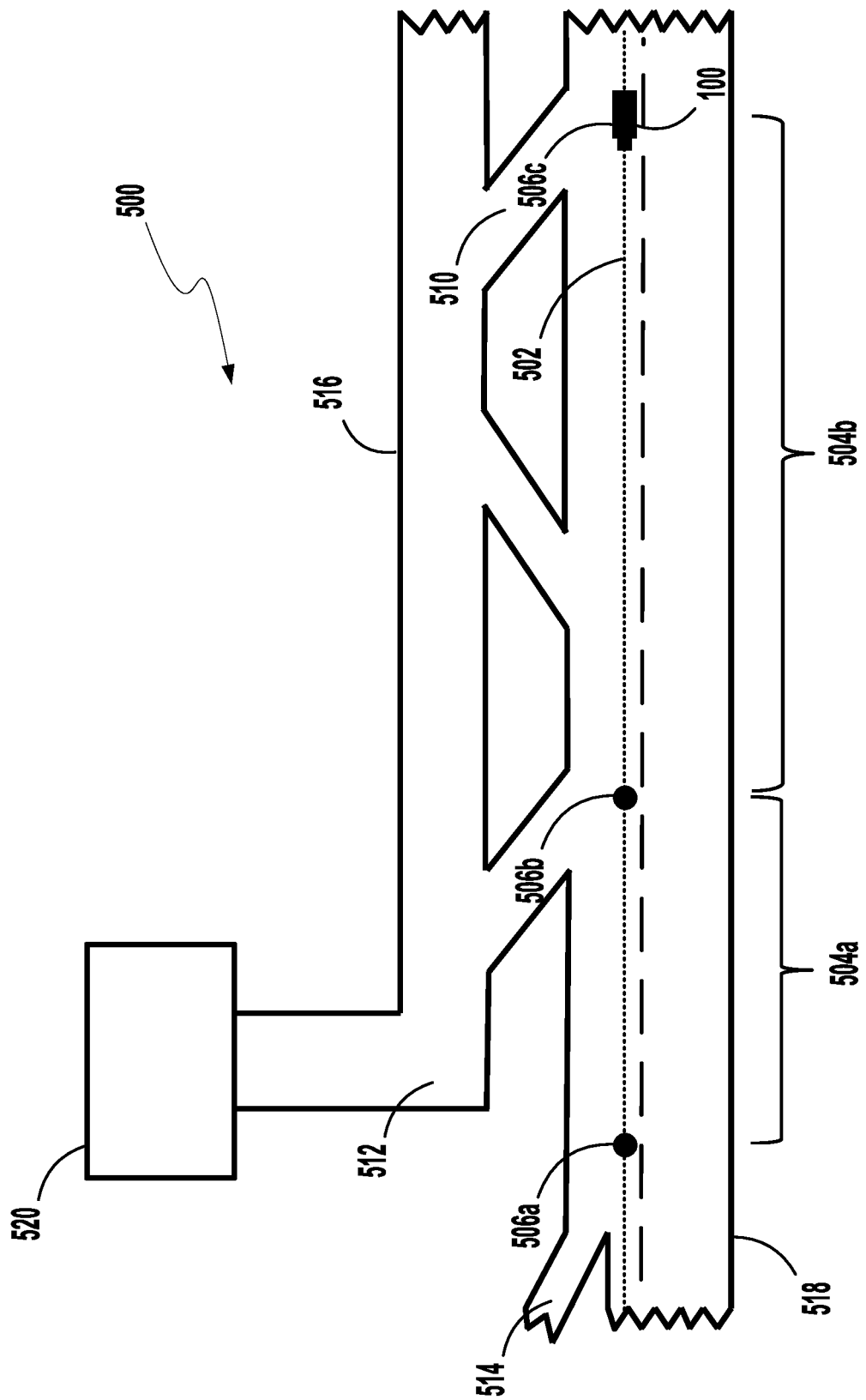
FIG. 5 illustrates an example segmented route, according to one or more example embodiments.

FIG. 5 illustrates one example of how the computing system 112 can segment a route 502. Route 502 can be a preplanned route (or a portion of route segments thereof) that the vehicle 100 is set to traverse, or can be one of a plurality of potential routes (or a portion of route segments thereof) that the vehicle 100 can traverse. As noted above, each of the segments 504a-504b can be portions of the route 502 between at least two geographical points 506a-506c. Specifically, decision points on the route can define the segments. For example, the geographical points for segment 504b could be the current geographical location of the vehicle 506c on the route and route decision point 506b. Alternatively, the computing system 112 can define a segment by two future decision points. For example, the computing system 112 can define segment 504a by decision point 506a and decision point 506b. A decision point could be a point where the controller of the vehicle 100 must make a decision whether to stay on the route, to leave the route and take an adjusted route for the segment, or to pull over. Examples of route decision points could be a turn off for a nearby operational depot 520 (e.g., a loading dock, a maintenance facility for trucks and other vehicles), a highway exit 510, an intersection of roads 512, or a highway interchange 514. A decision point could also be a point where the vehicle 100 can return to the route from an adjusted route.

Potential route segments can be identified in other ways as well, based on one or more criteria used additionally or alternatively to the decision points described above. In some examples, weather can define or otherwise correspond to the route segments that the computing system 112 considers in performing the herein-described techniques. For instance, weather data (also referred to herein as "spatiotemporal weather information" or "predicted weather data") that the computing system 112 receives can identify a geographical area in which one or more particular weather conditions is/are present, be they adverse weather conditions (e.g., heavy rain) or non-adverse weather conditions (e.g., light rain or fog). The computing system 112 can, in this situation, set the boundaries of a particular segment to be the anticipated or current boundaries of where the weather condition(s) is/are present. As a specific example, a start point of a particular segment can correspond to a point along the boundary of where a rainstorm is anticipated to be, and an end point of the particular segment can correspond to another point along the boundary of where the rainstorm is anticipated to be. Thus, the particular segment is entirely within the boundaries of the rainstorm. Phrased another way, a particular segment of the route can be defined by a patch or patches of weather along the route. Specifically, the two geographical points that define the segment can be a starting point of the weather condition predicted and an ending point of the weather condition predicted on the route such that the segment encompasses all of a specific weather patch. In other situations, the particular segment can be selected to be a segment that includes the patch of weather, but also includes other geographical areas that do not include any adverse weather.

In another embodiment, the segments can be fixed such that the route can be split into segments of equal length defined by geographical locations on the route. Additionally or alternatively, the segments can be continually updated. In doing so, the segments can move with the vehicle 100 down the route. For example, the segments can start a half mile ahead of the vehicle 100 and finish at the destination such that the segments continuously update every half mile and move down the route at small intervals. Breaking the segments into small updated intervals can make them more accurate. Alternatively, the segments can be continually updated, but remain a predetermined distance away from the vehicle 100 along the route. For example, a first segment of the segments (e.g., the segment that is sequentially first of all the segments) can start a half mile in front of the vehicle 100; the second segment can start two miles in front of the vehicle 100, so on and so forth. Additionally, the segments might not cover the whole route, but can extend along a portion of the route such that they only cover half of the route in front of the vehicle 100.

In another embodiment, one or multiple of a distance measurement, or a time measurement, can define the length or duration of the segments on the route. As an example, the segments can be 1-mile increments along the route. Alternatively, the segments can be defined by the expected time of arrival of the vehicle 100 at a point in the route and last for a 1-hour increment after reaching the point. In some cases, the segments along the route can overlap slightly (e.g., by a few miles, a few feet, or other distance). Overlapping the segments can increase the accuracy of the prediction of weather data in a segment that sequentially follows the first segment when the same or similar weather data is also present in the first segment. Since the closer segments can have less variance in weather data confidence, the farther out prediction can be marked as reliable. For example, the computing system 112 can flag weather predictions for farther segments with higher confidence than weather predictions of other farther segments when the farther segment includes weather patches that overlap with a closer segment.

In accordance with the disclosed techniques, the computing system 112 can also receive spatiotemporal weather information that is predictive of future weather conditions along each potential route segment that the computing system 112 identifies, including but not limited to the types of segments described above.

In some cases, the weather data can be received at a centralized location, such as (i) a server computing system that can be in communication with a fleet of autonomous vehicles or a fleet of other types of vehicles and/or (ii) a computing system of another vehicle that can be in communication with a fleet of vehicles. As such, the weather data can be stored at a centralized location and then dispatched among a fleet of vehicles so that the fleet can all adjust their speeds accordingly. Additionally, vehicles that are currently travelling on a route can use their sensors to acquire data representative of the weather conditions they are currently travelling through and send the acquired data to the centralized location so that the data can be shared with other vehicles. Weather data gathered by the vehicles can further be used to refine future weather models to improve accuracy over time. Additionally or alternatively, the weather data can be sent directly to another vehicle and stored in a memory on the vehicle.

In one embodiment, the computing system 112 can query for weather forecasts across one or more segments of the route. In some examples, these segment-specific weather predictions can be obtained by utilizing hyperlocal weather forecasts. Hyperlocal weather forecasts can take the form of region-specific weather forecasts and can be as specific as determining weather data in an exact GPS location for every minute up to an hour. The segments can allow for more-accurate hyperlocal weather data to be gathered and updated periodically as the vehicle 100 travels down the route, even when the weather data spans multiple segments, because the queries can be for hyperlocal weather at a time near the time of query. In some embodiments, the queries are made only in the area of the route encompassing the route. Alternatively, general forecasts can also be used which correspond to a greater geographic area (e.g., towns, or counties). Particularly, in situations when a large undesirable weather pattern is predicted to cross the route, it can be meaningful to consider weather patterns that are far away from the vehicle 100 in order to make a significant change to the time of arrival of the vehicle 100 in the segment with the undesirable weather pattern.

In some examples, the hyperlocal weather forecasts can be queried for a specific time the vehicle 100 is predicted to arrive at a segment. In such examples, segments that are farther from the vehicle 100 and have a less predictable arrival time can be less accurate in their predicted hyperlocal weather. In some embodiments, only the segments of the route closest to the vehicle 100 that the vehicle 100 can arrive in near to the time of query might be queried for hyperlocal weather, while segments farthest from the vehicle 100, with an arrival time farther from the time of query, can be queried for general forecasts (e.g., with lower resolution). For example, the computing system 112 can query in minute or sub-minute resolution for precise weather along the route for the upcoming ten miles. This is because, at local time ranges, the accuracy of the predicted weather is high. Alternatively, for a location in the route that is two hours away from the vehicle 100, the computing system 112 can query more coarsely. For example, in 15 minute increment estimates or in larger segments of the route. Because of the greater variance in arrival time at segments farther out, high resolution weather queries may not be as accurate, so a general forecast can be used to determine the weather in the area surrounding the farther segment. For both hyperlocal weather and general forecasts, the variance in weather predictions can be higher if the queries for those predictions are for a time that is too far out from the time of query.

To receive the weather data, the computing system 112 may further query at predefined intervals for weather forecasts across one or more segments of the route that are ahead of, and within a predetermined distance from, a current location of the vehicle 100. For example, querying can be optimized by searching for weather data at predefined intervals, such as every 5 to 10 minutes. Querying every 5 to 10 minutes can allow for the weather to develop and solidify, but such querying might not allow so much time to pass that the weather becomes unpredictable and difficult to plan around. In some cases, the weather predictions for the segments nearest the vehicle 100 can be the most accurate, due to there being less variance as to when the vehicle 100 will arrive in the segment. Because the timing for arrival in the segment can be accurately predicted, the weather data prediction for that location can be more precise, especially when it is in the middle of a weather pattern. Therefore, it is the boundaries of weather patterns that are queried the most, because these locations have the most uncertainty and impact on the route.

Potential route segments whose weather conditions are predicted with greater certainty/accuracy might not need to be queried as much as potential route segments that contain the boundaries of weather patterns. Alternatively, segments which contain the boundaries of weather patterns, and thus have greater uncertainty and impact on the speeds and/or routes according to which the vehicle 100 should travel, can be queried with great frequency in order to better predict the weather data at that segment. However, it can be determined that the segments a greater distance from the vehicle 100 might be queried with low frequency due to the difficulty in producing an accurate weather data prediction.

In some examples, the computing system 112 might not query all of the segments at the same frequency. If weather is generally clear, the queries can be made with low frequency, but if weather is foggy, snowy, rainy, etc. to an undesirable degree, the computing system 112 can increase the frequency of the queries to maximize information that might influence the travel plan. For example, at first, segments farther from the vehicle 100 might not be queried frequently due to possible variance in segment arrival time. However, farther segments can be queried with general forecasts to alert the computing system of possible incoming weather conditions. For example, the predicted weather data received during a query of a farther segment can make the computing system 112 aware of the possibility for particularly undesirable weather. If predicted weather data indicates a risk of severe weather, the computing system 112 can query the farther segments at a higher frequency in order to better predict incoming weather data so as to plan the speed(s) at which the vehicle 100 will travel. For example, the vehicle 100 could drive 250 miles over the course of 4 hours. By adjusting the speed by 5 or 10 miles per hour, the vehicle 100 could make a 30 mile jump in terms of where it was predicted to be located and where it is actually located. Those 30 miles could assist in avoiding the undesirable weather. Additionally, segments that have predicted weather data of particular concern to the vehicle's travel can be queried more frequently than the other segments.

The computing system 112 can receive predicted weather data in various ways. In an example embodiment, the computing system 112 can receive the predicted weather data from a weather station server or other type of server. The weather station server can be a weather station server that is local to a particular geographic area, segment, etc. along or near the route—that is, a weather station server that is dedicated to the particular geographic area, segment, etc.

and configured to acquire weather data corresponding to the particular geographic area, segment, etc., and transmit the weather data to one or more vehicle computing systems. Additionally or alternatively, the weather station server can be a global weather station server that is configured to acquire weather data corresponding to multiple locations, such as an entire state, county, country, etc. The global weather station server can also operate as a server configured to collect weather data from a plurality of local weather station servers and transmit the collected weather data to one or more vehicle computing systems. In some embodiments, the weather station server can be configured to predict weather conditions in various ways and include varying types of information in the weather data. For example, the weather station server can predict weather conditions in the form of fog, mist, snow, rain, etc. The act of such a weather condition prediction might involve the weather station server (or the vehicle 100) monitoring and analyzing an indication of a fog, mist, rain, etc. quality. Other example functionality of local or global weather station servers is possible as well.

To facilitate receipt of predicted weather data from a weather station server, the computing system 112 might select a weather station server from a plurality of possible weather station servers and transmit, to the selected weather station server, a query for the predicted weather data. The computing system 112 can then receive the weather data from the selected weather station in response to the query.

Further, in some embodiments, the weather station server can be configured to publish updates to predicted weather data in certain locations to a fleet of vehicles (e.g., multiple distinct vehicle computing systems associated with multiple distinct vehicles) or to individual vehicles. Further, the weather station server can be configured to transmit predicted weather data to the vehicle system in response to receiving a query for the predicted weather data from the computing system 112 and/or without being specifically requested by the computing system 112 (e.g., configured to publish weather data updates for the particular location every 30 minutes). Other examples are possible as well.

In any of the examples provided herein, the predicted weather data can be time stamped so that the computing system 112 can use the timestamp as a reference in adjusting its speed and/or route.

In another example embodiment, the predicted weather data could be received from a second vehicle (e.g., a lead/preceding vehicle). Specifically, the computing system 112 can identify that the second vehicle has travelled, or is travelling, in one or more potential route segments ahead of, and within a predetermined distance from, a current location of the vehicle 100. The vehicle 100 could query the second vehicle if it is a predetermined distance ahead of the current location of the vehicle 100. If the second vehicle is too far away from the vehicle 100, the data gathered by the second vehicle might not be as accurate. While travelling, the second vehicle could have gathered data regarding its environment such as predicted or current weather data. Once the second vehicle is identified, the vehicle 100 can request weather data gathered by the second vehicle by querying a second computing system of the second vehicle for the predicted weather data in one or more segments.

In an additional example embodiment, the weather station server could gather weather data from the second vehicle. For example, while travelling, the second vehicle could have gathered data regarding its environment, such as weather data that it is travelling through. The weather station server could query the second vehicle for gathered weather data, or a second vehicle computing system could automatically send gathered weather data to the weather station server. The weather station server can use the gathered weather data from the second vehicle as well as weather forecasts to make weather predictions for the computing system 112 to receive.

In addition to allowing the route to be more efficiently queried, the segments can allow the computing system 112, using the vehicle speed, to determine when the vehicle 100 is predicted to arrive at a particular segment. The particular segment can further be queried for predicted weather data, as discussed above, and the computing system 112 can determine that at the time the vehicle 100 is predicted to be travelling at a first speed through the particular segment, weather is predicted to occur in the particular segment.

Using a cost function, the computing system 112 can output a cost based on cost factor inputs. The cost factors can include the predicted weather data for the segment for each respective target speed of the plurality of target speeds. Based on the speed associated with the lowest cost, for the particular segment of the route the vehicle 100 can adjust the vehicle's speed and avoid a weather condition predicted for the particular segment. Selecting the speed associated with the lowest cost may also be referred to herein as minimizing the cost or minimizing the cost function with respect to the speed.

In some cases, a second, different cost function can be used for a plurality of target routes of the vehicle, where the second cost function includes as input a second set of cost factors and provides as output a cost based on the second cost factors, where for each respective target route of the plurality of target routes, the second cost factors include the predicted weather data and the respective target route. The second cost function can consider as the variable input, the plurality of target routes. As the different target routes are input into the cost function, the values of the cost function may change. For example, one route may have a faster arrival time than another route. Additionally, the target routes can include a route that leads the vehicle to an operational depot.

In one embodiment, the cost function can include a partial cost function and a total cost function. The partial cost function can determine a cost for each of the potential route segments that the vehicle 100 can travel. The partial cost function can include a set of segment-weighted cost factors, such as adverse weather risk based on the future weather conditions along the respective potential route segment. The segment-weighted cost factors can include a numerical value which can change depending on a speed. The segment-weighted cost factors can then be summed together for each respective potential route segment. The summed values of the segment-weighted cost factors can be considered as a partial cost for each respective potential route segment.

The total cost function can be used to determine a minimized cost for selecting route segments with target speeds for the vehicle to utilize while traversing between the at least two geographical points. The total cost function can take all of the partial cost functions for each potential route segment, and sum them together. The total cost function can consider which of the route segments would collectively connect the two geographical points for the start and end of the trip, and can minimize the cost for each segment by considering different speeds to determine a minimum total cost. The outcome of the total cost function can be a set of selected route segments that span between the two geographical points and corresponding route segment target speeds for the vehicle to utilize so as to avoid adverse weather conditions.

Equation 1, Equation 2, and Equation 3 provide an example of a partial cost function, a total cost function, and a way to determine an optimal set of route segment target speeds, $S_{opt}$ by minimizing the total cost function, respectively, where the total cost function is applied across n potential route segments.

$$c_1(s) = (w\_weather_1 * weather\_risk(s)_1) + w\_fuel_1 * fuel\_consumption(s)_1 + w\_ETA_1 * ETA(s)_1) \quad \text{(Equation 1)}$$

$$C(S) = \Sigma_n(c_n(s)) \quad \text{(Equation 2)}$$

$$S_{opt} = \text{argmins} C(S) \quad \text{(Equation 3)}$$

In particular, Equation 1 shows $c_1(s)$ as an example partial cost function for a first potential route segment (n=1). As a general matter, a partial cost function can act as a measurement of a cost per potential route segment as a function of speed. As shown, the partial cost function of Equation 1 is made up of a set of segment-weighted cost factors, each of which includes a cost factor (as a function of speed) and an associated weight. The partial cost function of Equation 1 includes three cost factors, i.e., an adverse weather risk factor, a fuel consumption factor, and an ETA factor, each of which represent a respective type of risk/cost as a function of speed. However, as described herein, other types of segment-weighted cost factors are considered and such other cost factors could be incorporated into the partial cost function.

For the partial cost function to calculate a cost, the cost factors can be assigned numeric values. For example, weather risk can be mapped to numbers such that a 1 could be the lowest risk of weather occuring and 10 could be the highest, while fuel consumption could be an amount of fuel typically burned at a speed. Because the weights can be associated with values having different scales, such weights can be normalized, in some cases. In some examples, for a given cost factor, the weight associated therewith can be based on the absolute or relative importance of the cost factor as the vehicle travels along the route. For instance, fuel consumption may be weighted heavily when the vehicle is on a long journey without opportunities to replenish fuel. In some examples, the weight for a particular cost factor can change from segment to segment, such as if the importance of that cost factor varies from segment to segment.

Each cost factor can have different values as a function of vehicle speed along the given segment. For example, at 60 miles per hour the vehicle could have a high chance of encountering a weather condition, and thus a high numerical value for the cost factor, but if the vehicle were to slow down to 50 miles per hour the weather could pass, and thus the value for the cost factor could be low. Similarly, the partial cost function can calculate costs for the cost factors based on the different speeds. For example, at 60 mile per hour the vehicle can consume a greater amount of fuel than driving at 50 miles per hour.

Equation 2 next shows C(S) as an example total cost function for a set of n potential route segments. Particularly, the total cost function can sum all of the costs calculated in the partial cost function for each potential route segment as a function of speed.

Equation 3 next shows how to optimize the total cost function, C(S) to find a set of selected route segments and corresponding route segment target speeds, $S_{opt}$ that produce the lowest cost. In particular, the total cost function can consider which of the potential route segments collectively connect the at least two geographical points. Based on which potential route segments can collectively connect the at least two geographical points, the total cost function can determine a target speed for each potential route segment that minimizes the total cost. The output, $S_{opt}$, can be a set of selected route segments and corresponding route segment target speeds for the vehicle to utilize while traveling that minimize the total cost function.

As previously mentioned, the cost function can calculate costs for the total of the cost factors depending on different speeds. In order to determine the optimal set of speeds, the cost function can be minimized. By minimizing the cost function, a speed may be determined for each segment that, when taken as a whole with the other speeds for the other segments, may produce the lowest cost function. The speed for each segment can then be consolidated into the optimal set of speeds for the route.

A cost function can be used to calculate a total cost for a plurality of cost factors, which change based on an input variable. The cost function can include multiple cost factors, each with an associated numerical value. For example, precipitation can be mapped to a numerical amount of weather and arrival time can be the amount of time left in a trip. As previously mentioned, the value for each of the cost factors can vary depending on changes to the input variable, which in turn affects the total cost. For example, the computing system 112 can consider predicted weather and arrival time as cost factors in the cost function. Each of these cost factors can change depending on speed. For example, at some speeds, the vehicle may encounter bad weather along the route, or the vehicle may have a late arrival time at some speeds. The cost function can then output a cost based on these variable cost factors. The speeds associated with bad weather and late arrival times may also be associated with a high total cost. The cost function can consider a plurality of speeds and select whichever speed is associated with the lowest total cost. Specifically, the computing system 112 can calculate a cost from a cost function factoring weather data predicted for a time when the vehicle 100 is predicted to encounter the weather data to determine a plurality of speed and route adjustments with the lowest cost for avoiding the weather.

For the cost function inputs, the computing system 112 can consider a plurality of weighted cost factors, a plurality of speeds, and a plurality of routes to determine the lowest cost. The computing system 112 can adjust the route based on the lowest cost. The cost function can be determined with discrete optimization and by assigning weights to a plurality of cost factors. The cost factors could include, for example, a probability of the weather condition occurring on the route, a distance that the vehicle 100 has travelled from a starting point of the route, an amount of fuel used by the vehicle 100 since the starting point of the route, a remaining time that the vehicle 100 is predicted to take to reach an ending point of the route, and/or a distance from the vehicle 100 to a known operational depot, among other possible cost factors. The cost factors can further be assigned numeric values to calculate the cost of the cost function. For example, the probability of the weather condition occurring can be mapped to a numerical value, for example the more severe the weather, the higher the numerical value. The distance can be a number of miles travelled on the route or remaining in the route, the amount of fuel can be the fuel utilization, remaining time can be the amount of hours or minutes left on the route, and distance from the operational depot can be the number of miles the vehicle is away from the operational depot.

Weather data queried from hyperlocal weather forecasts can also include the probability of weather data considered in the cost function. The cost function can consider the weather nearest the vehicle first when calculating costs. However, in some embodiments, weather data for a segment might be disregarded when calculating the cost function. For example, weather data that indicates a particular weather condition has lower than a particular threshold probability of occurring (e.g., below 40%) can be ignored by the computing system 112. In other words, weather data that identifies one or more weather conditions that has/have less than a certain probability of occurring might not be taken into consideration by the computing system 112 when adjusting the route. In other examples, the predicted weather data might not include any weather data Each of the cost factors considered in the cost function can be assigned a weight based on the cost factor's importance value. For example, if the vehicle 100 has a deadline for arriving at a destination, and no weather is queried for upcoming segments, the cost factor for remaining time that the vehicle 100 is predicted to take to reach an ending point of the route can be weighted more than the cost factor of probability of a weather condition occurring on the route. The weights used in the cost function can collectively add up to 1, or can each be any integer multiplier.

In one embodiment, the computing system 112 can assign to each segment, a weight that is based on the predicted weather data corresponding to that segment. Particularly, when the segments are defined by the predicted weather conditions, the severity of the weather condition may influence the weight of the segment. For example, a segment defined by a hailstorm may be weighted more heavily than a segment defined by a light rain shower.

In some examples, a user can manually input (or write source code or other instructions that indicate) one or more of the weights of the cost factors based on user preference, and the computing system 112 can implement the cost factors accordingly. Additionally or alternatively, the computing system 112 itself can set the weights of one or more of the cost factors.

Further, even in embodiments where the weights are set by the user and/or automatically by the computing system 112, the computing system 112 can revise the cost function during the journey. For example, the computing system can dynamically adjust at least one of the weights for the cost factors while the vehicle is travelling the route. For example, the weights could change according to the time of day. Since travelling at night through undesirable weather can increase risk, the weight of the probability of weather can change throughout the route as night approaches. Therefore, the cost function can weigh the weather factor heavier in segments with undesirable weather at night than during the day. Additionally, if the route is long, there can be more weight given to fuel spent, or if there is an important delivery, time taken can be weighted higher.

In an additional example, the weights of the cost factors can remain relatively static based on the goals and risks being balanced. However, new information about events happening after the current trip could cause the computing system 112 to update the weights as well. For example, before embarking or while travelling the route, the vehicle 100 may be selected to travel a subsequent trip. In that case, the computing system 112 can increase the weight of the remaining time that the vehicle 100 is predicted to take to reach an ending point of the route in an attempt to reach the destination promptly so as to be available for the subsequent trip. In an additional embodiment, the computing system 112 can revise the cost function by adding additional cost factors during the journey, such as one or more respective cost factors that are assigned to each segment. For example, the computing system 112 can receive information of an accident along the route that is causing large traffic delays. The computing system 112 can add accidents along the route as a cost factor and weigh the cost factor according to the amount of delay in order to update the target speed and/or the route.

In one embodiment, the cost function can scale the cost with a risk associated with operating the vehicle at the respective target speed in view of the predicted weather data. Specifically, the cost function can give more weight to factors that can cause a risk to the vehicle when the vehicle is driving through predicted weather data. For example, driving in rain at 40 mph might have a small risk but driving in rain at 60 mph might have a much higher risk. The higher risk might outweigh the benefit of arriving at the destination earlier.

As previously mentioned, the cost function can consider a plurality of variables of which the values will change based on the input. For example, traveling a speed of 70 mph can have a faster estimated time of arrival (ETA) and may use more fuel than traveling 55 miles an hour. The total costs of the factors depending on the two different speeds may therefore be different. The computing system 112 can thereafter determine, from the costs provided by the cost function, a lowest cost. One embodiment may also include, in a similar manner to the cost function, determining from costs provided by the second cost function, a lowest cost. The second cost function may input different routes and different routes with operational depots to vary the cost factors. The computing system 112 can then determine the lowest cost.

The selected target speed can be used as the target speed for the vehicle 100 on one or more segments that precede the segment that has the undesirable weather condition, and/or can be used as the target speed for the vehicle 100 on the segment that has the undesirable weather condition. For example, to avoid a weather condition in a third of four segments of a route, the selected target speed can be used in the first or second segment so that the vehicle 100 slows down for enough time to allow the weather condition to end in the third segment. Additionally or alternatively, to avoid the same weather condition, the selected target speed can be used in the third segment (e.g., before the vehicle 100 reaches a portion of the third segment in which the weather condition is present). Other examples are possible as well.

In some examples, the optimal target speeds that are used to traverse the optimal route segments can be included in a speed profile for the vehicle 100. The speed profile is or includes an ideal speed or multiple ideal speeds for the vehicle 100 that is/are defined by specifying a range, one or more constraints (e.g., keep the vehicle's speed at 55 mph in order to meet a particular goal), or an average. Whereas, the actual speed of the vehicle 100 can be determined by the vehicle's onboard computer in real time, based on current road or environmental conditions.

The speed profile can take various forms, such as a range of speeds, a maximum or minimum speed, or a sequence or list of speeds at which the vehicle 100 is to travel on the route, including the selected target speed at which the vehicle 100 is to travel the route. That is, the speed profile defines the manner in which the speed of the vehicle 100 will change over time as the vehicle 100 travels on the route. The speed profile can also change in real-time as the vehicle 100 travels on the route.

In some embodiments where the route is separated into segments, as described in more detail below, the speed profile can include, for each of one or more of the segments, a speed or speeds at which the vehicle 100 can travel for that segment. For example, for a route divided into a plurality of segments, the cost function can be evaluated for each segment of the plurality of segments. In those situations, the sequence of speeds in the speed profile can include the respective target speed associated with the lowest cost for each of the segments in the plurality of segments.

As previously mentioned, in addition to allowing a route to be more efficiently queried, the segments of the route can be used for planning the speed profile, based on the predicted weather data. In particular, the computing system 112 can determine that the vehicle is driving a first speed. The speed can be adjusted for at least one segment of the route from the first target speed to the selected target speed to avoid undesirable weather conditions in upcoming segments of the route. The selected speed can be incorporated into an updated speed profile and the computing system 112 can then implement the updated speed profile. For example, the speed can be changed at the start of a current segment from the first target speed to a selected target speed which can allow the vehicle 100 to avoid the predicted undesirable weather in the segment. Updating the speed profile can be accomplished by decreasing the speed in the speed profile from the first speed to the selected target speed to cause the vehicle 100 to slow down and allow undesirable weather to pass while continuing to travel in the segment. The computing system can also perform the method dynamically as the vehicle is travelling, such that the computing system repeatedly updates the speed profile.

Adjusting the speed profile can also be accomplished by increasing the speed of the vehicle 100 from the first target speed to a higher selected target speed to cause the vehicle 100 to traverse the remainder of its current segment or at least a portion of the particular segment before a time that the undesirable weather condition arrives or before a majority of the time that the undesirable weather condition is predicted to occur. Alternatively, the selected speed can be implemented at a certain point and time in a segment. In this manner, the vehicle 100 can gradually change speed so as to reach the selected speed at the correct time instead of immediately changing to a selected speed. The updated speed profile then applies for the duration of the current segment. The computing system 112 can also update the speed profile in a segment from the first speed to the adjusted speed to avoid a predicted weather condition in an upcoming second segment of the route. However, in situations where the weather patterns or conditions are extreme and avoiding through normal driving speeds proves impossible, the vehicle 100 can intentionally slow down and come to a stop on the shoulder or off the highway in the segment for some determined time until a more suitable plan becomes available. In other words, the computing system 112 executes a zero-speed action for a set time (e.g., allow time to pass in the optimization while making zero forward progress).

Figure 6:
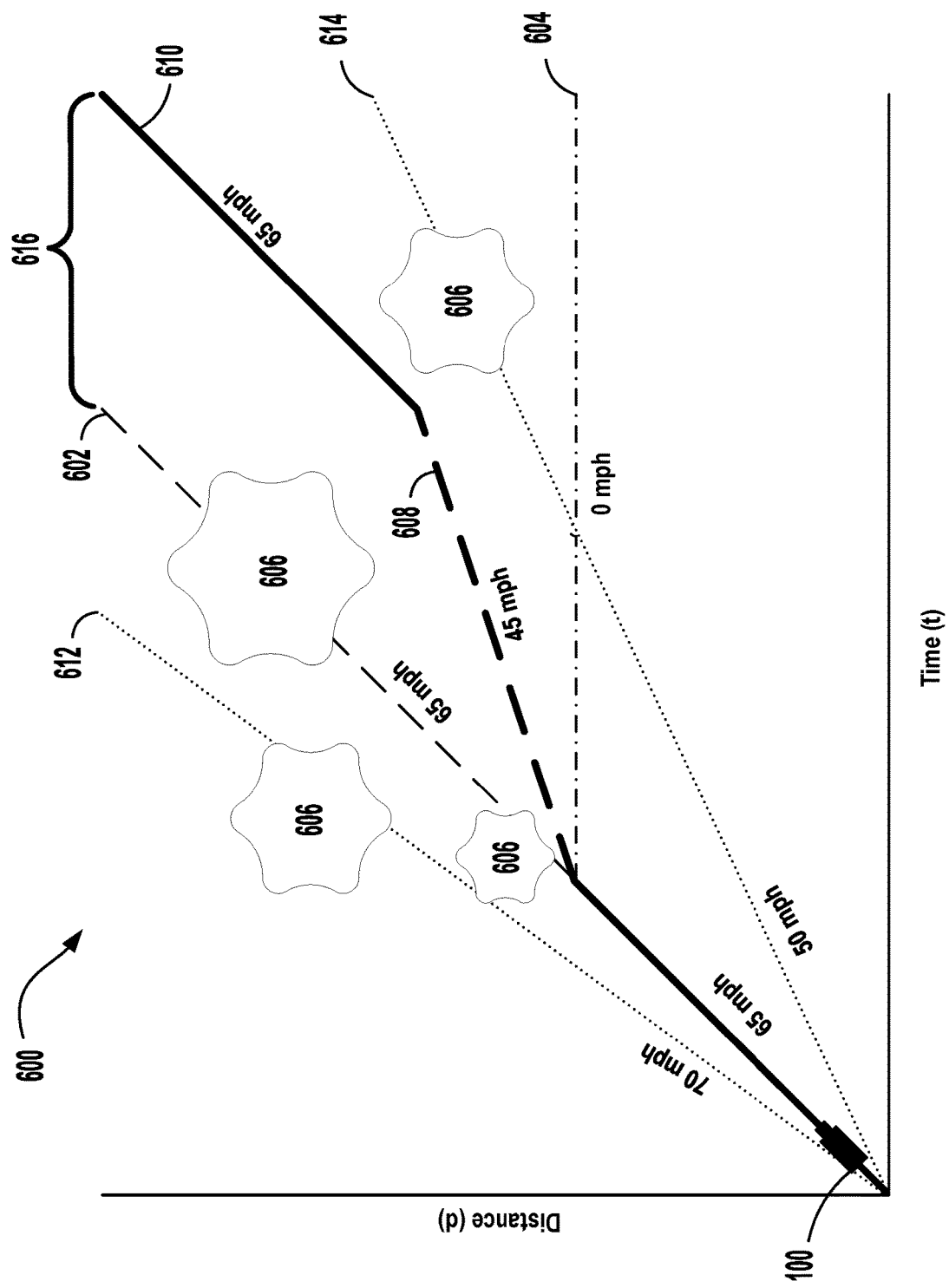
FIG. 6 illustrates an example speed profile, according to one or more example embodiments.

FIG. 6 illustrates an example speed profile for the route 610 in the form of a graph 600. On the graph, the x-axis represents time and the y-axis represents distance in the progress along the route 610. In practice, the computing system 112 can determine an optimal speed profile for multiple route options. For example, the computing system 112 can determine that there are three route options from Dallas to Los Angeles. Each route option in the route 610 can span multiple freeways and vary in geographical direction, but can have a fixed distance. The computing system 112 can determine an optimal speed profile for each route option and select the route with the lowest cost as the route 610. FIG. 6 illustrates an optimal speed profile for one possible route option of the route 610. On the graph, the x-axis represents time and the y-axis represents distance in the progress along the route 610. The graph of FIG. 6 includes a straight line that represents an initial speed 602 of a speed profile for the vehicle 100 from distance=0 in the route 610 to a goal a fixed distance away (e.g. 650 miles over 10 hours). Further, it should be understood that straight lines shown in the graph of FIG. 6 do not indicate that the route 610 is straight geographically, but rather represent a portion of the speed profile where the vehicle 100 is travelling at a fixed speed. In other variations, steeper sections of the line refer to faster speeds along the route 610. Respectively, flatter sections of the line refer to slower speeds along the route 610. The flat line 604 represents a spot of a fixed period of time where speed=0.

In addition, FIG. 6 also depicts undesirable weather conditions, represented as blob-like regions 606 on the route 610, impacting a particular distance along the route 610 over a particular time window. In an example embodiment, the vehicle 100 might be travelling on the route 610 at 65 miles per hour (mph). However, at 65 mph, the vehicle 100 might encounter undesirable weather. By reducing the speed to 45 mph for portion 608 of the speed profile, the vehicle 100 can avoid the undesirable weather on the route 610. Thus, the computing system 112 can update the speed profile to make an adjustment to route 610. Since the route 610 can have both speed and route components, an adjustment to the route 610 can be considered at least one of adjusting by selecting a target speed, or selecting a target route. The graph also illustrates the difference 616 in arrival time between the speed for the route 610 and the adjusted speed.

The use of hyperlocal weather can allow for a computing system 112 to make a query while the vehicle 100 is travelling along its route to get probabilistic results for weather conditions at various future times and locations farther along the route. Such queries can provide the probability and distribution of weather along the route and allows the computing system 112 to plan a speed profile that aligns with the weather probability along a route of travel. For example, the vehicle 100 can go slower during part of the graph which would reduce its forward progress which places the vehicle 100 at a different range in the graph's space.

FIG. 6 also shows on the graph, a first line 612 that represents the maximum speed possible during the journey. Some embodiments may also include, as well as a second line 614 that represents the maximum amount of time that can be taken for the route. In some embodiments, when specified by user input, the maximum amount of time that can be taken for the route can be a hard constraint, or a bounding box. For example, the route 610 can fall below the maximum time line 614 temporarily during the journey, but the route 610 can end above the maximum time line 614. In this way, time line 614 can represent a bounding box where at a certain time, the vehicle 100 should also be at a certain distance. However, maximum amount of time is not a necessary constraint, or bounding box, in some examples. The space between the first and second lines can represent the region(s) along and surrounding the route that is searched for bad weather.

In some examples, the computing system 112 can also select, from a plurality of target routes, a target route that minimizes a particular cost function (e.g., the second cost function referred to above). In some cases, this can involve selecting a route to an operational depot. Selecting the target route associated with the lowest cost may also be referred to herein as minimizing the cost or minimizing the cost function with respect to the route. Once the computing system 112 has calculated costs for the plurality of target routes, the computing system can select the target route associated with the lowest cost.

Once a set of target speeds are selected for the vehicle 100 to utilize, the computing system 112 can control the vehicle 100 to operate in accordance with the set of target speeds. In an example, the act of controlling the vehicle 100 to operate in accordance with the set of target speeds can involve the computing system 112 transmitting instructions to the control system 106 of the vehicle 100 to operate in accordance with the set of target speeds. Because the set of target speeds can be incorporated within the speed profile, the computing system 112 can also control the vehicle 100 to operate in accordance with the speed profile. The instructions can include data representing the speed profile with the selected set of target speeds incorporated within. Upon receipt of the instructions, the control system 106 can responsively control the vehicle 100 to navigate in one or more of the ways described above. Further, the computing system 112 can similarly control the vehicle 100 to operate in accordance with the selected target route.

Based on the minimized cost function, the computing system 112 can make an adjustment to the speed and or route and control the vehicle 100 to operate in accordance with the adjustment. The adjustment can be or include the selected set of target speeds for avoiding the weather condition in at least one segment of the route and/or the selected target route that the vehicle 100 is configured to navigate for avoiding the weather condition in at least one segment of the route. In an example embodiment, the computing system 112 might implement both the selected set of target speeds and the selected target route. By implementing both, the vehicle 100 might be better equipped to avoid undesirable weather. Further, the computing system 112 can dynamically calculate the cost function as the vehicle 100 is travelling to repeatedly update the route and the speed profile while the vehicle 100 is traveling the route in order to avoid undesirable weather.

The weather data queried by the computing system 112 on which to base the adjustment can take the form of various types of weather-related information, such as fog, freezing temperatures, snow, rain, sleet, or other precipitation, among other possibilities. In an example embodiment, predicted weather data could also be used to determine and select a target route to avoid a hazardous road condition present in a segment. The computing system 112 could receive predicted road condition data by querying a particular segment for weather data, as previously discussed, and determine that although the weather condition might no longer be in the particular segment, the predicted weather data (or other data that the computing system 112 receives) indicates that the weather created hazardous road conditions predicted to be present at a time when the speed profile of the vehicle plans for the vehicle to be travelling at the first speed in the particular segment. For example, heavy rain could leave wet, slippery roads, or snow and rain could leave icy, slippery roads. The computing system 112 can therefore adjust the speed of the vehicle 100 to avoid the hazardous road condition based on a minimized cost function that factored in the hazardous road condition. Additionally or alternatively to receiving predicted road condition data, the computing system 112 could receive data indicating an altitude and/or a degree of incline associated with different potential route segments, and the computing system 112 can use that data as a basis for avoiding certain route segments, if possible, such as route segments having greater than a threshold degree incline. This may be particularly useful with heavy trucks carrying heavy cargo.

In an example embodiment, the computing system 112 can determine for at least one segment of the route, a selected target speed for avoiding the weather condition. As previously discussed, as the vehicle 100 travels along a route, the vehicle 100 can query upcoming segments to determine the weather in each segment and adjust the speed that the vehicle 100 is currently travelling in the speed profile to the selected target speed. The computing system 112 can adjust the speed profile with the selected target speeds and control the vehicle 100 to operate in accordance with the selected target speeds such that the speed of the vehicle is increased at one or more points along the route, the speed is decreased at one or more points along the route, and/or the vehicle 100 is brought to a complete stop for a particular amount of time at one or more points along the route. The speed adjustment selected can depend on the type and location of predicted weather data. For example, the speed of the vehicle 100 can be reduced in order to avoid a weather prediction in a future segment, or might only be reduced enough to provide safe driving conditions through less serious weather. However, if there is not a lower cost, or if there is no weather data above a threshold level, the vehicle 100 might not need to update its speed profile, in which case, the vehicle 100 can adhere to an optimal speed profile and an optimal route for the route.

To avoid undesirable weather, the speed profile could be adjusted in the vehicle's 100 current segment to cautiously traverse future segments that do not have opportunities for the vehicle 100 to pull over. For example, the computing system 112 could adjust the speed profile in a current segment to liberally avoid any occurrence of weather patterns over a long, narrow bridge with no opportunities to pull over. Because the decision points for adjusting the route are farther apart, the computing system 112 can be more sensitive to weather. Alternatively, the route could be adjusted to avoid the bridge all together.

In some embodiments, determining the selected target speed for avoiding the weather condition includes determining an optimal speed for avoiding the weather condition that minimizes the cost function, and adjusting the speed for the at least one segment from the first target speed to the adjusted speed includes adjusting the speed for the at least one segment from the first target speed to the optimal adjusted speed. The selected target speed can be considered the optimal speed or the optimal adjusted speed. For example, the computing system 112 can determine the optimal speed through the minimized cost function. For optimization of the speed, discrete speed profiles can be searched and encoded to "wait" for weather along the route to pass by slowing down, or get "ahead" of weather by speeding up. Each discrete option, representing the action along a segment, can then be weighted by the costs. The computing system 112 can then set the lowest cost speed profile as the optimal speed for avoiding the weather condition. The computing system 112 can then set the optimal speed as the adjusted speed.

In some embodiments, the computing system 112 can set a speed profile for the route and might only update the speed profile if the computing system 112 determines that the predicted weather data exceeds a confidence threshold for severity. If the confidence threshold is exceeded, the computing system 112 can then update the speed profile to avoid the weather by slowing down the vehicle 100 in order to allow undesirable weather to pass before the vehicle 100 arrives. Alternatively and additionally, the computing system 112 can provide instructions (e.g., to the control system 106) for the vehicle 100 to speed up if a query returns results that indicate that (i) the weather in a segment is clear, but (ii) if the vehicle 100 does not travel through at least a portion of the segment by a particular time, the weather will become undesirable at approximately the particular time and thus the vehicle 100 might pass through the undesirable weather. The computing system 112 can also rank the severity of weather data that is over the confidence threshold to determine exactly how to update the speed profile in order to avoid the more or most severe weather. Based on the severity of the weather, the most severe weather can be ranked higher even if it has a lower confidence level than less severe weather. However, in some embodiments, the computing system 112 can update the speed profile as the severe weather approaches. For example, if ahead of the vehicle 100 there is a moderate storm that the vehicle 100 must slow down to miss, but farther ahead there is a dangerous storm that the vehicle 100 must speed up to beat the vehicle 100 can slow down to miss the first storm and then optimize for the second storm, including pulling over to wait the storm out.

In an example embodiment, the computing system 112 can also control the vehicle to operate in accordance with the selected target route. Particularly, the computing system can determine that the vehicle 100 is on a first target route and adjust the route (e.g., adjust a set of navigational directions) from the first route to the selected target route (e.g., to a selected set of new navigational directions). The route can be adjusted from the first route to the selected target route in a particular segment with undesirable weather or in a segment before a segment with undesirable weather in order to avoid the weather. In an example embodiment, the segments of the route can be used to make adjustments to the route. In particular, the computing system 112 can query, at predefined intervals, for weather forecasts across one or more segments of the route that are ahead of, and within a predetermined distance from, a current location of the vehicle 100. Once a minimized cost function is calculated for a particular segment of the route using the queried predicted weather data, the computing system 112 can determine a target route for the particular segment associated with the minimized cost function. The selected target route can be used to avoid undesirable weather conditions and hazardous road conditions predicted to occur at a time when the speed profile of the vehicle 100 plans for the vehicle 100 to be travelling at the first speed in the particular segment of the route.

The computing system 112 can receive predicted road condition data, evaluate a cost function for a plurality of target speeds of the vehicle, where the cost function includes as input a set of cost factors and provides as output a cost based on the cost factors, where for each respective target speed of the plurality of target speeds, the cost factors include the predicted road condition data and the respective target speed, determine, from costs provided by the cost function, a lowest cost, select, from the plurality of target speeds, a target speed associated with the lowest cost, and control the vehicle to operate in accordance with the selected target speed to avoid the hazardous road condition. For example, the computing system 112 could receive predicted road condition data by querying a particular segment for weather data, as previously discussed, and determine that although the weather condition might no longer be in the particular segment, the weather created hazardous road conditions predicted to occur at a time when the speed profile of the vehicle plans for the vehicle to be travelling at the first speed in the particular segment. The computing system 112 can therefore adjust the speed and or route of the vehicle 100 to avoid the hazardous road condition based on a minimized cost function that factored in the hazardous road condition.

As previously discussed, decision points can define the segments. At each decision point the computing system 112 can determine whether the cost of taking a selected target route at the decision point would be lower than continuing on the route. If the cost is lower, the vehicle 100 can take the selected target route for at least the segment. Adjusting the route can be performed dynamically by the computing system 112. For example, once the route is adjusted to the selected target route, the computing system 112 can make further adjustments. At a decision point marking the end of the particular segment of the adjusted route, the computing system 112 could decide to return to the route, or to deviate further from the route. In an example embodiment, a highway can have frontage roads that run adjacent to the highway. Referring back to FIG. 6, the highway 618 is flanked by a frontage road 616. The frontage road 616 is easily accessible at each decision point 606a-606b on the route 602. The frontage roads typically have lower speed limits than highways. The cost of traveling a speed limit on a frontage road through a weather condition could be less than traveling at a lower speed on a highway through a weather condition. Even though the speed profile is lowered on the highway, there might still be risks caused by other vehicles travelling at high speeds, thus increasing cost. That is to say, the computing system 112 will choose an adjusted route that has a lower cost than the cost of the particular segment of the route for avoiding a weather condition. Similarly, once the vehicle 100 has traveled through the weather condition on the frontage road, the computing system 112 could recalculate a minimized cost to return the vehicle 100 the route on the highway at the next decision point.

In an example embodiment, the computing system 112 can control the vehicle 100 to operate in accordance with the selected target route and proceed to an operational depot. Particularly, the computing system 112 can determine that the selected target route with the lower cost than at least the cost of the particular segment of the route includes determining a location of an operational depot and redirecting the route for at least the particular segment to the operational depot. For example, in a particular segment with an undesirable weather condition, the computing system 112 can determine that the cost function is minimized by reducing the speed to zero. However, stopping the vehicle 100 on the side of the road might not be safe in the particular segment or future segments that the vehicle 100 is navigating. In an example embodiment, the vehicle 100 could take a target route to a safe location and reduce the speed profile to zero, effectively stopping the vehicle 100 at a known safe location to wait for the undesirable weather to pass. Therefore, the target route with the lower cost than at least the cost of the particular segment of the route could be to redirect the route for the particular segment to an operational depot and to stop. Referring back to FIG. 6, operational depot is accessible from the route 602. If the weather became too treacherous, based on a minimized cost function, the computing system 112 could instruct the vehicle 100 to exit the highway 618 at decision point 606b and proceed to the operational depot 620. The locations of the operational depots can be stored in a memory of the computing system 112. Alternatively, a centralized control system can send the location of an operational depot to the computing system 112.

The computing system 112 can also determine an optimal adjusted route that minimizes the cost function to adjust the route for the at least one segment from the route to the optimal adjusted route. It should be understood that the selected target route can be considered the optimal adjusted route. For optimization of the route, discrete route segments can be searched that avoid weather. The discrete routes can then be weighted by the costs. The computing system 112 can set the lowest cost discrete route as the optimal adjusted route for avoiding the weather condition. The optimal adjusted route is then set as the adjusted route for the vehicle 100 to navigate. Additionally, the computing system can intentionally, and automatically, delay the departure time entirely, to maximize the optimization of the route.

As previously mentioned, the computing system 112 can dynamically update the route as the vehicle 100 travels. Specifically, as the vehicle 100 travels, the route of the vehicle 100 for a particular segment can be repeatedly updated based on the changing cost function. The computing system 112 can evaluate the second cost function while the vehicle is navigating a current segment of the first target route, select, from the plurality of target routes, a second target route associated with the lowest cost, and adjust the route from the first route to the second target route at the end of the current segment. This adjustment to the second target route can happen while the vehicle is travelling and may continue to repeatedly update, such that the route continues to change.

However, the route can also be dynamically updated without segmenting the route. For example, the computing system 112 can receive predicted hyperlocal weather data that is a predetermined distance, approximately 1-10 miles, ahead of the vehicle 100 on the route. Based on the predicted weather data, the computing system 112 could dynamically update the cost function to determine a new strategy for navigating the route with the lowest cost. If the new strategy for navigating is lower than the planned strategy for navigating the route, the computing system 112 could make adjustments to the route based on the new strategy. In this embodiment, the speed and route can continually update to minimize the cost function instead of updating based on segments.

In some embodiments, the computing system 112 can also determine, for the at least one segment of the route, a selected target speed and a selected target route that the vehicle 100 is configured to navigate for avoiding the weather condition. For example, the computing system 112 can modulate the speed of the vehicle 100 to advantageously avoid bad or otherwise undesirable weather that is predicted to occur in a segment of the route. However, if after modulating the speed the speed profile of the vehicle 100 still predicts the vehicle 100 to encounter the weather condition in the segment of the route, the route can be adjusted in at least the segment to further avoid the weather condition.

In an example embodiment, making the adjustments to the speed and/or the route and controlling the vehicle 100 can be performed dynamically based on the weather forecasts. For example, the computing system 112 can continually make changes to the route if weather forecasts across one or more segments of the route that are ahead of, and within a predetermined distance from, a current location of the vehicle 100, are undesirable and if the cost function has determined a lower cost.

In an example embodiment, the operations disclosed herein with respect to FIG. 7 can be performed before the vehicle 100 begins to travel on the route. For example, before the vehicle 100 departs, the method can be used to determine the initial route to optimize for preferable weather conditions.

In some embodiments, the computing system 112 might not divide the route into a plurality of segments. Instead, for example, the computing system 112 can query weather data associated with one or more locations along or near the route and, upon identifying a predicted weather condition in a particular segment of the route (e.g., a portion of a highway that passes through a city), the computing system 112 can perform the other operations described above to avoid the predicted weather condition. Other examples are possible as well.

FIG. 7 is a flowchart of a method 700, according to an example embodiment. Method 700 may include one or more operations, functions, or actions as illustrated by one or more of blocks 702-708. Although the blocks of each method are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700, and other processes and methods disclosed herein, the flowcharts show functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 700, and other processes and methods disclosed herein, one or more blocks in the flowchart may represent circuitry that is wired to perform the specific logical functions in the process.

Method 700 can be performed by various computing systems, such as computing system 112 that is configured to control the vehicle 100. Other computing systems—including those onboard or remote from the vehicle 100—can perform one or more operations of the method 700 and/or one or more of the operations described above, such as server computing system 406.

At block 702, the method 700 involves identifying one or more potential route segments that collectively connect at least two geographical points.

At block 704, the method 700 involves receiving spatiotemporal weather information that is predictive of future weather conditions along each of the potential route segments. The spatiotemporal weather information can be or include hyperlocal weather forecasts or other types of weather data, by way of example, including any of those discussed herein. In some cases, block 704 can be performed after block 702, and the identification of the one or more potential route segments can be based at least in part on the spatiotemporal weather information (e.g., designating, as a potential route segment, a portion of road that is entirely within a rainstorm).

At block 706, the method 700 involves for each potential route segment, evaluating a partial cost function that comprises a summation of a set of segment-weighted cost factors, where at least one segment-weighted cost factor comprises an adverse weather risk factor based on the future weather conditions along the potential route segment. That is, the partial cost function can be or include a weighted risk of at least weather for a given potential route segment.

At block 708, the method 700 involves selecting, based on a minimization of a total cost function, a set of selected route segments and corresponding route segment target speeds for the vehicle to utilize while traversing between the at least two geographical points so as to avoid adverse weather conditions, where the total cost function is the sum of partial cost functions associated with a set of route segments that collectively connect the at least two geographical points.

By way of the method 700, the computing system can, in some implementations, evaluate each of many different possible route segments, some of which might not be selected if those segments result in the vehicle driving through adverse weather. In other implementations, however, the method 700 can result in selection of a route segment in which an adverse weather condition is currently present, but can also result in the selection of at least one target speed for at least one route segment that precedes the adverse weather route segment so as to avoid the adverse weather condition (e.g., the vehicle slows down or pulls over and stops in an earlier route segment so that it can drive through the adverse weather route segment after the adverse weather is gone).

The total cost function can take the form of Equation 1 described above, and minimization of the total cost function can be represented by Equation 2 described above, by way of example.

A set of selected route segments can be a sequence of contiguous route segments that together form a route, such as a route composed of a first segment, followed by a second segment, followed by a third segment, with the third segment ending at the vehicle's destination. As such, the corresponding selected route segment target speeds can include a first target speed according to which the vehicle will traverse the first segment, a second target speed according to which the vehicle will traverse the second segment, and a third target speed according to which the vehicle will traverse the third segment.

In some embodiments, a given target speed that is selected based on the total cost function can be or include (i) a range of speeds within which (inclusive or non-inclusive) the vehicle should travel along the corresponding selected route segment, (ii) a maximum speed at or under which the vehicle should travel along the corresponding selected route segment, (iii) a minimum speed at or over which the vehicle should travel along the corresponding selected route segment, or (iv) an average speed at which the vehicle should travel along the corresponding selected route segment. Further, in some cases, the speed profile of the vehicle can be determined or updated to include the selected target speeds.

In some embodiments, and as discussed above, the at least two geographical points comprise a current geographical location of the vehicle on the route and a route decision point. A route decision point can be, for example, an operational depot (e.g., a loading dock of a facility, or a maintenance facility), a highway exit, an intersection, a gas or charging station, or an interchange.

In some embodiments, the method 700 can also involve identifying, based on the spatiotemporal weather information, one or more geographical adverse weather areas that correspond to one or more selected route segments. For example, one or more of the selected route segments can be route segments whose boundaries correspond to boundaries of a geographical area in which adverse weather is present or is anticipated to be present, such as a rainstorm or a group of multiple adverse weather conditions that may or might not at least partially overlap in their geographical area. As a more particular example, a rainstorm might occupy a first geographical area and thick fog might occupy a second geographical area that at least partially overlaps with the first geographical area. As such, one potential route segment that is one of the selected route segments can be a route segment whose start and end point both fall on, or are inside of, a boundary of a combination of the first and second geographical areas, such that the rainstorm and/or the thick fog are or are predicted to be present throughout the entire route segment. In such embodiments, the target speeds selected for any selected route segment that is within the one or more geographical adverse weather areas can be selected to mitigate adverse weather effects along that/those selected route segments (e.g., slow the vehicle down before a route segment where a rainstorm is present so that the rainstorm is no longer present by the time the vehicle reaches the route segment).

In some embodiments, the act of identifying the one or more potential route segments can involve identifying one or more speed-limit-change points between a current location of the vehicle and a destination for the vehicle at which a speed limit change is present and then identifying the one or more potential route segments to be one or more potential route segments that collectively connect the at least two geographical points including the identified one or more speed-limit-change points. For instance, a potential route segment can be a route segment in which the speed limit is 55 mph, and a new route segment can begin thereafter at a location (e.g., at a speed limit sign) where the speed limit changes from 55 mph to 65 mph. Speed-limit-change points can be a useful start or end point for a route segment because the speed limit that is present in that route segment can limit the vehicle's target speed (e.g., along a 65 mph route segment, the vehicle can travel at a target speed of 55 mph, but likely not lower than that).

In some embodiments, the act of identifying the one or more potential route segments can involve identifying a preplanned route. That is, the preplanned route can include the set of selected route segments. Phrased another way, while the method 700 can be used to select an optimal set of target speeds and/or an optimal set of route segments to the vehicle to utilize, the method 700 can also be used to select an optimal set of target speeds for the vehicle to utilized along a route that has already been selected or planned, so as to avoid adverse weather conditions along the preplanned route.

In similar embodiments, the act of identify the one or more potential route segments can involve identifying a plurality of preplanned routes that each connect a current location of the vehicle to a destination of the vehicle, in which case the act of selecting the set of selected route segments comprises selecting from among the plurality of preplanned routes. Phrased another way, the method 700 can be used to select an optimal route (and associated optimal target speeds) from a limited number of options. For instance, the vehicle can receive three route options to travel from a warehouse in Dallas to a warehouse in Boston, and the method 700 can be used to optimize across the three route options.

In some embodiments, and as discussed above, the act of receiving the spatiotemporal weather information can involve identifying a lead vehicle that has travelled, or is currently travelling, on at least one of the one or more potential route segments and that is ahead of, and within a predetermined distance from, a current location of the vehicle. The act of receiving the spatiotemporal weather information can also involve in response to identifying the lead vehicle, querying a second computing system of the lead vehicle (e.g., a central computing system/control system onboard the lead vehicle) to obtain at least a portion of the spatiotemporal weather information. Additionally or alternatively, at least a portion of the spatiotemporal weather information can be retrieved from a server computing system with which a fleet of vehicles, including the vehicle and the lead vehicle, are in communication.

In some embodiments, and in line with the discussion of cost functions herein, each segment-weighted cost factor that can be used in accordance with the partial cost function referred to at block 706 can include a respective cost factor and a respective weight. In some examples, the respective weight can be used as a multiplier for the respective cost factor and can be an integer or other numerical value that represents a desired weight or importance for that respective cost factor. Such weights can be static or can dynamically change as circumstances surrounding the vehicle change or as the vehicle's capabilities change. For instance, a weight for the adverse weather risk factor can be high at first, but if the vehicle's sensor systems improve such that the vehicle is less threatened by a predefined severity of rain, snow, etc., the weight can be lowered.

In some embodiments, the weight that corresponds to a particular cost factor can be the same for two or more different potential route segments or can be different. Further, in some cases, each potential route segment can be assigned a respective weight. Weights can be used across multiple segments or can be per segment. For instance, a potential route segment that is known to have smooth terrain and/or low vehicle traffic can be assigned a lower weight for the adverse weather risk factor than a potential route segment that is known to have bumpier terrain and/or high vehicle traffic.

In some embodiments, the adverse weather risk factor can be based on a type or types of the future weather condition(s) along the given potential route segment. As discussed above, a type of future weather condition can be or include rain, fog, snow, freezing rain, sleet, and/or hail, among other possibilities. Additionally or alternatively, the adverse weather risk factor can be based on an anticipated severity of the future weather conditions along the given potential route segment and/or on a probability of the future weather conditions being present along the given potential route segment at a time the vehicle is anticipated to travel along the given potential route segment.

As discussed above, various segment-weighted cost factors are possible for use in the partial cost function (and thus the total cost function) that the herein-described techniques minimize to obtain optimal speeds and/or routes. In some embodiments, for example, the set of segment-weighted cost factors can include, in addition to the adverse weather risk factor, (i) a distance factor that is based on a total distance that the vehicle has travelled, or is anticipated to travel, from a route starting point of the at least two geographical points, (ii) a fuel consumption factor that is based on a current or anticipated fuel level of the vehicle, and/or (iii) ETA factor that is based on an ETA of the vehicle to reach a route intermediate point or a route end point. Other segment-weighted cost factors are possible as well, including but not limited to, a delivery factor that is based on a delivery time window within which the vehicle is expected to deliver cargo, a ground elevation factor that is based on a known angle of incline and/or altitude of a given potential route segment, a road traffic/accident factor that is based on traffic or vehicle accidents along a given potential route segment, and/or a public area factor that is based on known areas along a given potential route segment that have a high population density or otherwise tend to have numerous people present.

In some embodiments, segment-weighted cost factors, including those described above, can be added or removed from the partial cost function for all or some potential route segments at a given point in time, such as a point in time while the vehicle has departed its starting location and is either pulled over or driving. For example, a road traffic/accident factor might not initially be included as part of any partial cost function, but if it is determined that a road accident have suddenly occurred, the method 700 can be performed again and the road traffic/accident factor can be included in the partial cost function for at least the potential route segment in which the accident occurred. As another example, this can be particularly useful in a situation where the vehicle is travelling to a particular first destination and then, en route to the particular first destination, the vehicle computing system receives instructions to travel to a subsequent destination after it has reached the first destination. The potential route segments that can collectively connect the first destination to the subsequent destination might have new cost factors associated therewith for the vehicle to consider, and such cost factors can thus be used for at least those potential route segments.

To facilitate the addition of a segment-weighted cost factor, for instance, the method 700 can involve, after the vehicle has begun travelling along the set of selected route segments, determining a new segment-weighted cost factor that is different from the set of segment-weighted cost factors, adding the new segment-weighted cost factor to the set of segment-weighted cost factors to form a new set of segment-weighted cost factors, and then, for each remaining selected route segment, evaluating the partial cost function based on the new set of segment-weighted cost factors, and evaluating the total cost function with the updated partial cost functions.

In some implementations, the method 700 and one or more of the other operations described above can be performed before the vehicle departs a route starting point of the at least two geographical points.

In other implementations, the method 700 and one or more of the other operations described above can be performed periodically and/or dynamically as the vehicle is travelling, so as to adjust the set of selected route segments and the corresponding route segment target speeds for the vehicle to utilize while traversing between the at least two geographical points. Thus, as the vehicle is travelling, the route itself and/or the target speeds for each route segment can be reevaluated so as to maintain an optimal route and/or speed of travel from the route starting point, through any intermediate points, and until the route end point, or beyond.

Figure 8:
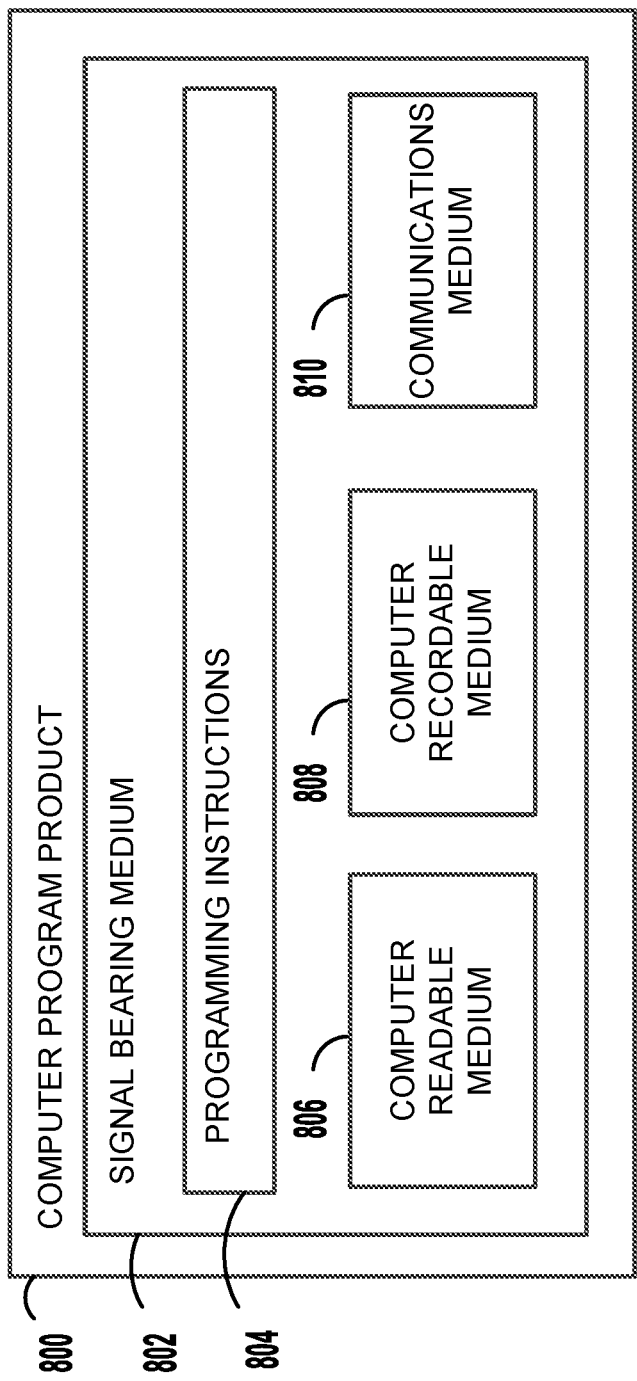
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods can be implemented as computer program instructions encoded on a non-transitory computer-readable storage media in a machine-readable format, or on other non-transitory media or articles of manufacture.

In one embodiment, example computer program product 800 is provided using signal bearing medium 802, which can include one or more programming instructions 804 that, when executed by one or more processors can provide functionality or portions of the functionality described above with respect to FIG. 7. In some examples, the signal bearing medium 802 can encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 can encompass a computer recordable medium 808, such as, but not limited to, memory, read/write (R/W) CDs, R/W DVDs, etc. In some implementations, the signal bearing medium 802 can encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 can be conveyed by a wireless form of the communications medium 810.

The one or more programming instructions 804 can be, for example, computer executable and/or logic implemented instructions. In some examples, a computing device such as the computing system 112 of FIG. 1 can be configured to provide various operations, functions, or actions in response to the programming instructions 804 conveyed to the computing system 112 by one or more of the computer readable medium 806, the computer recordable medium 808, and/or the communications medium 810. Other devices can perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method performed by a computing system configured to control operation of a vehicle, the method comprising:
   identifying one or more potential route segments that collectively connect at least two geographical points;
   receiving spatiotemporal weather information that is predictive of future weather conditions along each of the potential route segments;
   for each particular potential route segment of the one or more potential route segments, determining a partial cost function based on a summation of a plurality of segment-weighted cost factors associated with the particular potential route segment, wherein each segment-weighted cost factor of the plurality of segment-weighted cost factors comprises (i) a respective cost factor that is a function of speed of the vehicle and (ii) a respective weight that is based on an importance of the respective cost factor, wherein at least one segment-weighted cost factor comprises an adverse weather risk factor, and wherein the adverse weather risk factor is based on a probability as a function of speed of the vehicle of the vehicle encountering the future weather conditions along the particular potential route segment;
   selecting, based on a minimization of a total cost function, a set of selected route segments and corresponding route segment target speeds for the vehicle to utilize while traversing between the at least two geographical points, wherein the total cost function is the sum of partial cost functions associated with a set of route segments that collectively connect the at least two geographical points, and wherein a route segment target speed for one of the selected route segments in the set is selected such that the vehicle avoids an adverse weather condition in another of the selected route segments in the set; and
   controlling the vehicle to operate along the set of selected route segments at the corresponding route segment target speeds between the at least two geographical points.

2. The method of claim 1, wherein identifying the one or more potential route segments comprises identifying a preplanned route, and
   wherein the preplanned route comprises the set of selected route segments.

3. The method of claim 1, wherein identifying the one or more potential route segments comprises identifying a plurality of preplanned routes that each connect a current location of the vehicle to a destination of the vehicle, and
   wherein selecting the set of selected route segments comprises selecting from among the plurality of preplanned routes.

4. The method of claim 1, wherein the adverse weather risk factor is based on a type of the future weather conditions along the given potential route segment, the type comprising one or more of rain, fog, snow, freezing rain, sleet, or hail.

5. The method of claim 1, wherein the adverse weather risk factor is further based on an anticipated severity of the future weather conditions along the given potential route segment.

6. The method of claim 1, wherein the plurality of segment-weighted cost factors further comprise one or more of (i) a distance factor that is based on a total distance that the vehicle has travelled, or is anticipated to travel, from a route starting point of the at least two geographical points, (ii) a fuel consumption factor that is based on a current or anticipated fuel level of the vehicle, or (iii) an estimated time of arrival (ETA) factor that is based on an ETA of the vehicle to reach a route intermediate point or a route end point.

7. The method of claim 1, further comprising:
after the vehicle has begun travelling along the set of selected route segments, determining a new segment-weighted cost factor;
adding the new segment-weighted cost factor to the plurality of segment-weighted cost factors to form a new plurality of segment-weighted cost factors; and
for each remaining route segment of the set of selected route segments, evaluating the partial cost function based on the new plurality of segment-weighted cost factors.

8. The method of claim 1, further comprising:
dynamically adjusting at least one of the weights while the vehicle is travelling along the set of selected route segments.

9. The method of claim 1, wherein each target speed comprises one or more of a range of speeds, a maximum speed, a minimum speed, or an average speed according to which the vehicle traverses the corresponding selected route segment.

10. The method of claim 1, wherein the at least two geographical points comprise a current geographical location of the vehicle on the route and a route decision point, and
wherein the route decision point comprises at least one of an operational depot, a highway exit, an intersection, a gas or charging station, or an interchange.

11. The method of claim 1, further comprising:
identifying, based on the spatiotemporal weather information, one or more geographical adverse weather areas that correspond to one or more selected route segments,
wherein selecting the route segment target speeds for route segments within the one or more geographical adverse weather areas is based on an adverse weather effect associated with the one or more geographical adverse weather areas along the one or more selected route segments.

12. The method of claim 1, wherein identifying the one or more potential route segments comprises:
identifying one or more speed-limit-change points between a current location of the vehicle and a destination for the vehicle at which a speed limit change is present, and
identifying the one or more potential route segments to be one or more potential route segments that collectively connect the at least two geographical points including the identified one or more speed-limit-change points.

13. The method of claim 1, wherein receiving the spatiotemporal weather information comprises:
identifying a lead vehicle having a second computing system that has travelled, or is currently travelling, on at least one of the one or more potential route segments and that is ahead of, and within a predetermined distance from, a current location of the vehicle; and
in response to identifying the lead vehicle, querying the second computing system of the lead vehicle to obtain at least a portion of the spatiotemporal weather information.

14. The method of claim 1, wherein the method is performed before the vehicle departs a route starting point of the at least two geographical points.

15. The method of claim 1, wherein the method is performed periodically and/or dynamically as the vehicle is travelling, so as to adjust the set of selected route segments and the corresponding route segment target speeds for the vehicle to utilize while traversing between the at least two geographical points.

16. An article of manufacture including a non-transitory computer-readable medium having stored thereon instructions that, when executed by a processor in a computing system, causes the computing system to perform operations comprising:
identifying one or more potential route segments that collectively connect at least two geographical points;
receiving spatiotemporal weather information that is predictive of future weather conditions along each of the potential route segments;
for each particular potential route segment of the one or more potential route segments, determining a partial cost function based on a summation of a plurality of segment-weighted cost factors associated with the particular route segment, wherein each segment-weighted cost factor of the plurality of segment-weighted cost factors comprises (i) a respective cost factor that is a function of speed of the vehicle and (ii) a respective weight that is based on an importance of the respective cost factor, wherein at least one segment-weighted cost factor comprises an adverse weather risk factor, and wherein the adverse weather risk factor is based on a probability as a function of speed of the vehicle of the vehicle encountering the future weather conditions along the particular potential route segment;
selecting, based on a minimization of a total cost function, a set of selected route segments and corresponding route segment target speeds for the vehicle to utilize while traversing between the at least two geographical points, wherein a route segment target speed for one of the selected route segments in the set is selected such that the vehicle avoids an adverse weather condition in another of the selected route segments in the set; and
controlling the vehicle to operate along the set of selected route segments at the corresponding route segment target speeds between the at least two geographical points.

17. The article of manufacture of claim 16, wherein the adverse weather risk factor is based on a type of the future weather conditions along the given potential route segment, the type comprising one or more of rain, fog, snow, freezing rain, sleet, or hail, and
wherein the adverse weather risk factor is based on an anticipated severity of the future weather conditions along the given potential route segment.

18. A system comprising:
at least one processor; and
a memory storing instructions that, when executed by the at least one processor, cause the at least one processor to perform operations comprising:
identifying one or more potential route segments that collectively connect at least two geographical points;
receiving spatiotemporal weather information that is predictive of future weather conditions along each of the potential route segments;
for each particular potential route segment of the one or more potential route segments, determining a partial cost function based on a summation of a plurality of segment-weighted cost factors associated with the particular route segment, wherein each segment-weighted cost factor of the plurality of segment-weighted cost factors comprises (i) a respective cost factor that is a function of speed of the vehicle and (ii) a respective weight that is based on an importance of the respective cost factor, wherein at least one segment-weighted cost factor comprises an adverse weather risk factor, and wherein the adverse weather risk factor is based on a probability as a function of speed of the vehicle of the vehicle encountering the future weather conditions along the particular potential route segment;

selecting, based on a minimization of a total cost function, a set of selected route segments and the corresponding route segment target speeds for the vehicle to utilize while traversing between the at least two geographical points, wherein a route segment target speed for one of the selected route segments in the set is selected such that the vehicle avoids an adverse weather condition in another of the selected route segments in the set; and controlling the vehicle to operate along the set of selected route segments at the corresponding route segment target speeds between the at least two geographical points.

19. The method of claim 1, wherein at least one segment-weighted cost factor of the plurality of segment-weighted cost factors comprises:
- a fuel consumption factor that is a function of speed of the vehicle; and
- a weight that is based on an importance of the fuel consumption factor relative to one or more other cost factors in the plurality of segment-weighted cost factors.

20. The method of claim 1, wherein at least one segment-weighted cost factor of the plurality of segment-weighted cost factors comprises:
- an estimated time of arrival (ETA) factor that is a function of speed of the vehicle; and
- a weight that is based on an importance of the ETA factor relative to one or more other cost factors in the plurality of segment-weighted cost factors.

\* \* \* \* \*